US005513817A

United States Patent [19]

Nelson et al.

[11] Patent Number: 5,513,817
[45] Date of Patent: May 7, 1996

[54] SERVO SYSTEM

[75] Inventors: Alfred M. Nelson, Redondo beach; Robert P. Adams, Santa Monica, both of Calif.

[73] Assignee: Hightree Media Corporation, El Segundo, Calif.

[21] Appl. No.: 360,209

[22] Filed: Dec. 20, 1994

Related U.S. Application Data

[62] Division of Ser. No. 886,688, May 19, 1992, Pat. No. 5,392,976.

[51] Int. Cl.$^6$ .......................... B65H 20/00; B65H 23/18; B65H 23/24
[52] U.S. Cl. .......................................... 242/419.3
[58] Field of Search ................................. 226/24, 27, 28, 226/38, 93, 95, 97, 195, 196; 242/419, 419.3

[56] References Cited

U.S. PATENT DOCUMENTS

| | | |
|---|---|---|
| 2,956,300 | 10/1960 | Bruno . |
| 2,967,674 | 1/1961 | Lawrance et al. . |
| 2,984,398 | 5/1961 | Chalmers ................................. 226/95 |
| 3,231,668 | 1/1966 | Nishiwaki et al. . |
| 3,375,963 | 4/1968 | Wang et al. . |
| 3,420,424 | 1/1969 | Barbeau et al. ........................ 226/97 |
| 3,489,325 | 1/1970 | Epstein et al. ......................... 226/15 |
| 3,782,653 | 1/1974 | Scott ...................................... 226/38 |

(List continued on next page.)

FOREIGN PATENT DOCUMENTS

| | | |
|---|---|---|
| 0040464 | 3/1981 | European Pat. Off. . |
| 0091210 | 9/1983 | European Pat. Off. . |
| 1185891 | 1/1965 | Germany ............................... 226/95 |
| WO9210419 | 6/1992 | WIPO ..................................... 226/28 |

OTHER PUBLICATIONS

Ryan, D M, "Mechanical Design Considerations for Helical-Scan Viedotape Recorders", SMPTE Journal, V. 87, N. 11 (1978), pp. 767–771.

Zahn, H. L., "Friction–Its Influence in Rotary Magnetic Tape Recorders" SMPTE Journal, V. 98, N. 7 (1989), pp. 520–524.

Database WPI, Derwent Publications, Feb. 1991 Abstract, "Forming Quality Magnetic Recording Medium . . . ", Yamanaka et al. (91/072,882).

(List continued on next page.)

Primary Examiner—John P. Darling
Attorney, Agent, or Firm—Ellsworth R. Roston; Charles H. Schwartz

[57] ABSTRACT

A master tape movable in a closed loop including a pinch roller transfers a mirror image to a slave tape movable in a closed loop including a capstan. A thermomagnetic layer on the slave tape has a Curie temperature above which magnetic information is destroyed and below which magnetic information can be recorded on such layer. The thermomagnetic layer is heated above the Curie temperature, thereby becoming lengthened by thermal expansion just before the slave tape reaches the capstan. A downstream portion of a peripheral surface, preferably defining a cylindrical segment, on a first guide receives a pressurized fluid for sensing the tape tension in accordance with the tape width, distance from the cylinder axis and fluid pressure. An upstream portion of the guide peripheral surface receives a vacuum adjustable to regulate tape tension in response to variations in the pressurized fluid pressure. In regulating the tape tension, the spacing between the slave tape and the peripheral surface at the downstream portion is controlled. The master tape is lengthened by a second guide having the same construction as the first guide to compensate for the slave tape lengthening by the heater and the first guide, thereby producing a mirror image on the slave tape after the slave tape has cooled to the ambient temperature. Each of the master and slave tapes has a particular product of the Youngs modulus, tape width and tape thickness to provide a controlled strain on such tape when the tension on such tape is regulated.

24 Claims, 18 Drawing Sheets

U.S. PATENT DOCUMENTS

| | | |
|---|---|---|
| 3,825,948 | 7/1974 | Hendershot, III et al. . |
| 4,213,159 | 7/1980 | King . |
| 4,336,900 | 6/1982 | Pontoni .................................. 226/199 |
| 4,337,885 | 7/1982 | Stahler ..................................... 226/97 |
| 4,419,003 | 12/1983 | Fujie et al. ............................... 226/38 |
| 4,752,842 | 6/1988 | Odagiri . |
| 4,958,111 | 9/1990 | Gago ........................................ 226/24 |
| 5,032,936 | 7/1991 | Fujioka et al. . |

OTHER PUBLICATIONS

Wightman, W. O., "Air Bearing Tape Guide", IBM Technical Disclosure Bulletin, V. 27, N. 6 (Nov. 1984), pp. 3634–3635.

"Tension Arm Device", Patent Abstracts of Japan, V. 9, N. 163 (Jul. 9, 1985), p. 371.

Koloseus, J. C., "pnuematic Tape Lifter", IBM Technical Disclosure Bullentin, V. 27, N. 9 (Feb. 1985), p. 5346.

Ikuo, S. et al, "Production of Magnetic Recording Medium", Patent Abstracts of Japan, V. 10, N. 316, p. 510.

Fujitsu & Okamura, "Tape Tension Control System", Patent Abstracts of Japan, V. 9, N. 299, p. 408.

Yamagishi, K., "Contactless Thin Web Conveyor . . . ", Database WPI Aug. 1979 (Abstract).

"Appts. mfg. multiplayer metal thin film . . . ", Database WPI, May 13, 1988 (Abstract).

FIG. 3
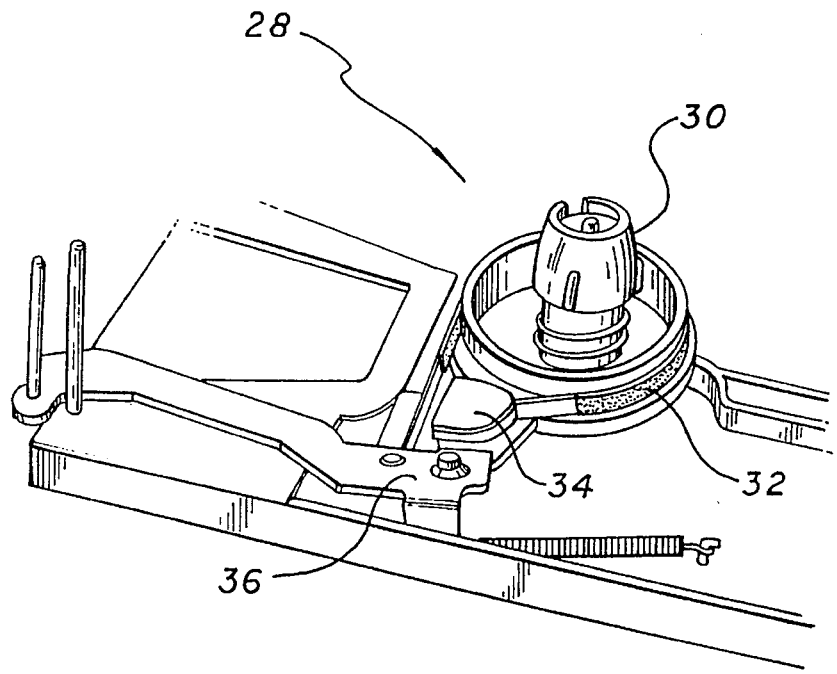
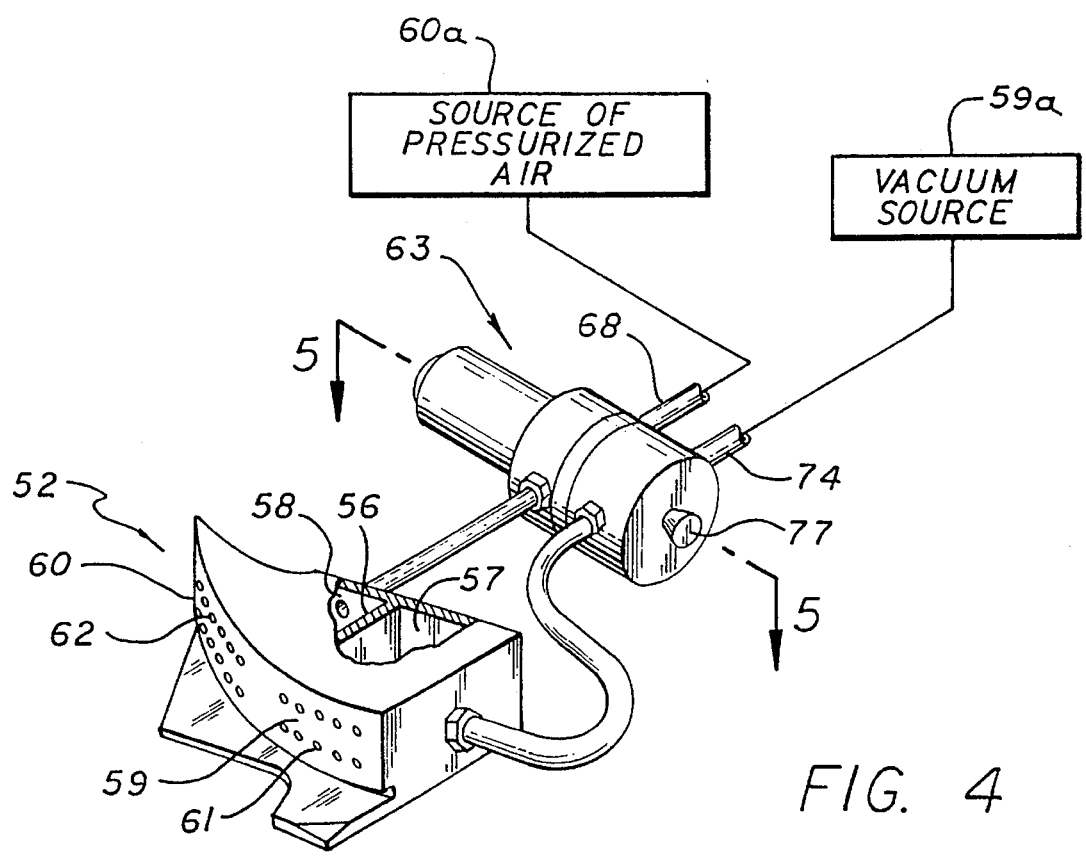
FIG. 4

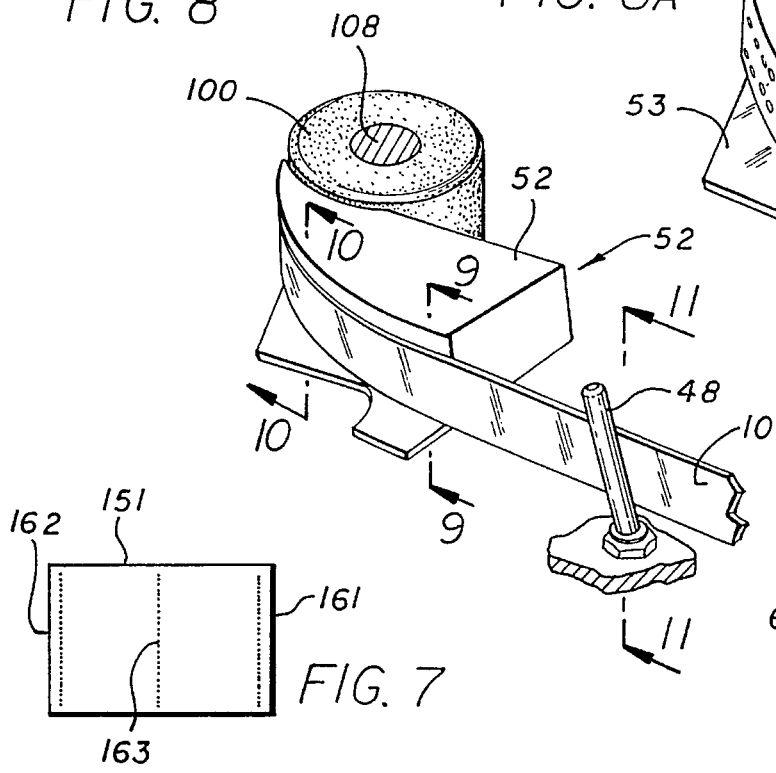
FIG. 8
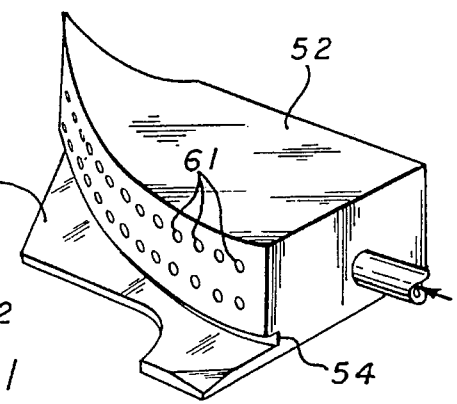
FIG. 8A
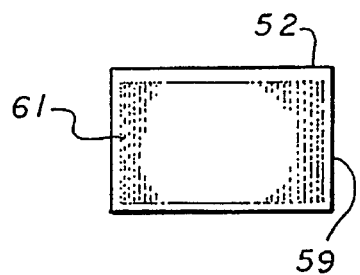
FIG. 6
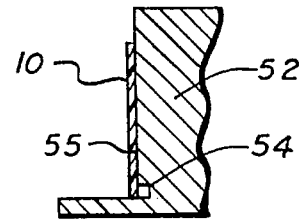
FIG. 7
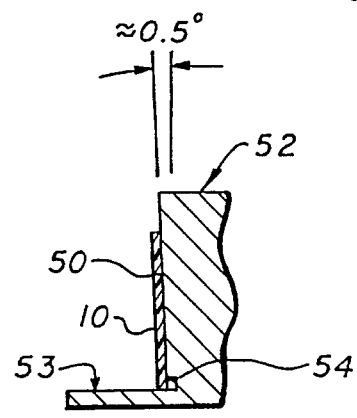
FIG. 9
FIG. 10
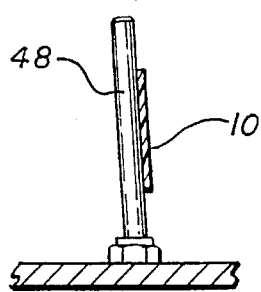
FIG. 11

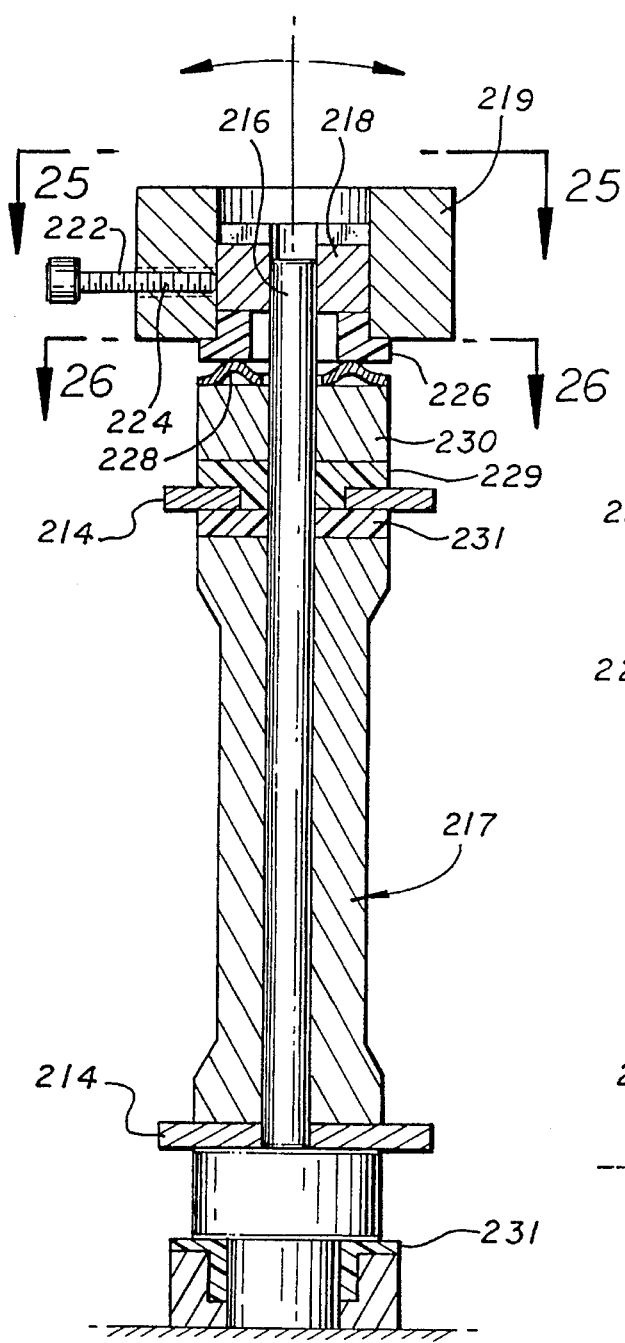
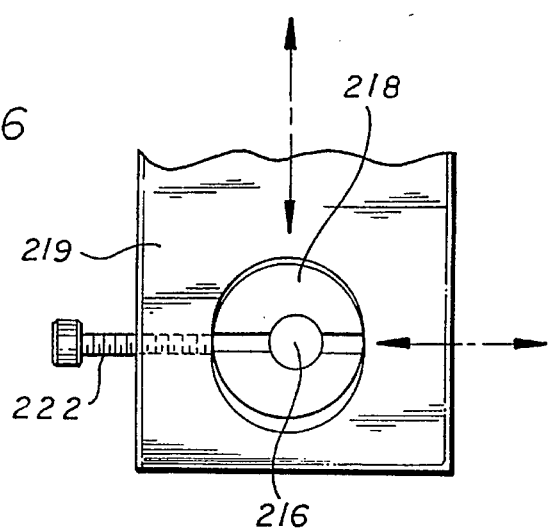
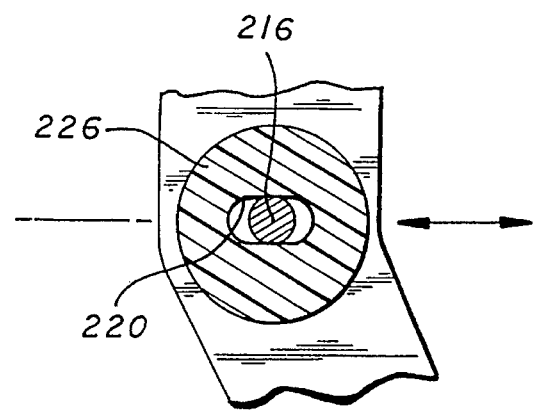
FIG. 24
FIG. 25
FIG. 26

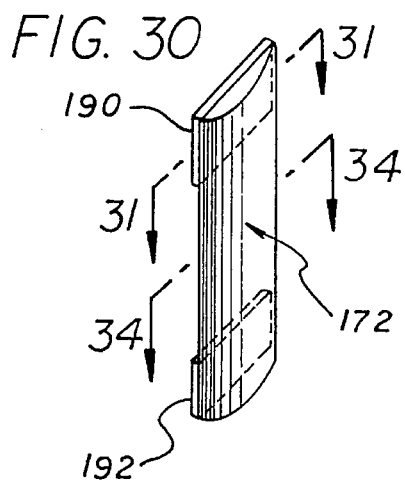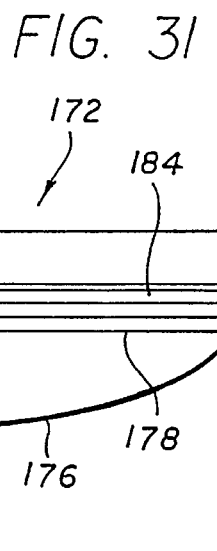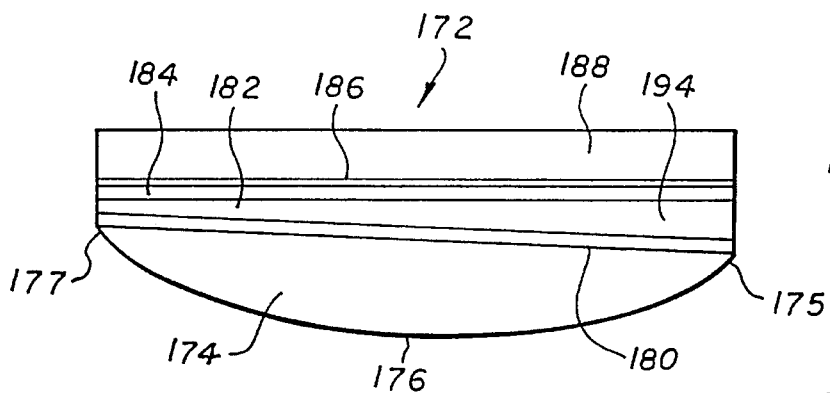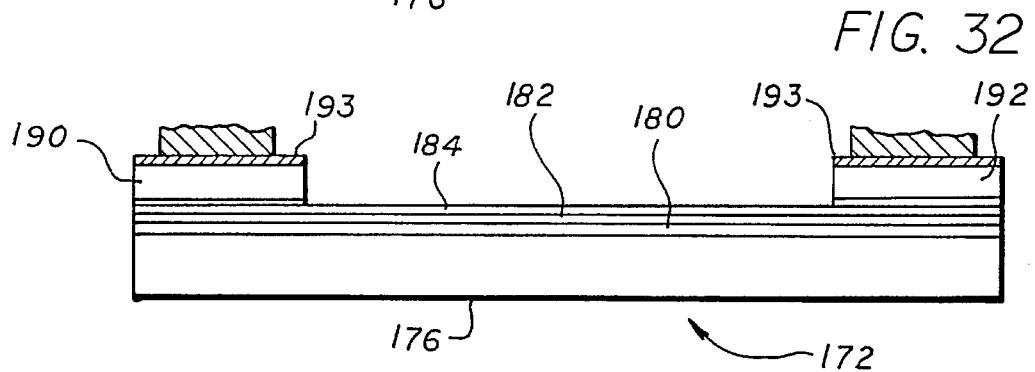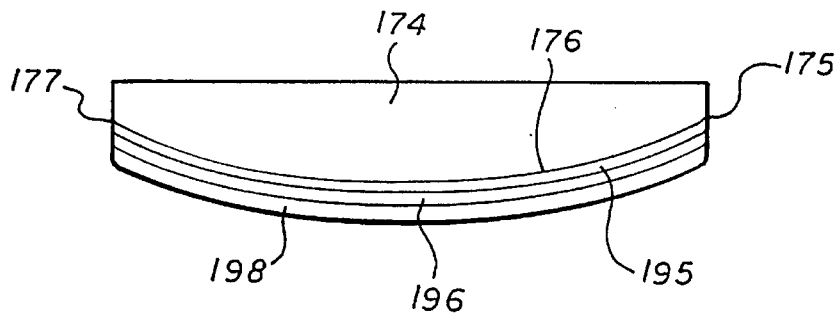

SERVO SYSTEM

This is a division of application Ser. No. 07/886,688 filed May 19, 1992 (now U.S. Pat. No. 5,392,976).

This invention relates to apparatus for, and methods of, transferring visual and audio information on a master tape to a slave tape. More particularly, this invention relates to apparatus for, and methods of, transferring visual and audio information in magnetic form on a master tape to a thermomagnetic layer on a slave tape. The invention also relates to a master or slave tape with properties individual to the apparatus and methods of this invention.

Visual and audio information is often stored on a tape for playback at a subsequent time. For example, visual and audio information relating to popular motion pictures is stored on tapes. These tapes are rented or sold at neighborhood stores. A popular movie such as "Batman" or a movie winning an Academy Award has millions of taped copies distributed to satisfy the demands of purchasers and renters. Substantially all of these taped copies have to be made available at a pre-selected release date in order to satisfy the pent-up demand of viewers for such taped copies. Although the demand for movie rentals and sales is great, the demand still seems to be increasing significantly from year to year.

Visual and audio information on tapes is not only provided in the form of movies for entertainment. It is also provided in large volume for business purposes. For example, large corporations deliver messages in the form of tapes to their sales personnel to acquaint such sales personnel with the construction, operation and advantages of new products. Since large corporations employ large numbers of sales copies, many copies of such messages have to be prepared for distribution to their sales personnel.

The visual and audio information on most tapes is in magnetic form. One reason is that information in magnetic form can be relatively easily and inexpensively reproduced. For example, most reproducing apparatus in the home use magnetic heads to read the information recorded magnetically on the tapes when the tapes are inserted into such apparatus. Another reason is that tapes with information recorded in magnetic form are less expensive to reproduce than tapes in other forms such as in optical form.

One type of tape for recording information in magnetic form has a thermomagnetic layer on the tape. The thermomagnetic layer may be formed from a suitable material such as chromium dioxide. The thermomagnetic layer has a Curie temperature at or above which any magnetic information on the tape is destroyed and below which magnetic information can be recorded on the tape. Thermomagnetic tape is advantageous because information can be recorded on the thermomagnetic tape at a temperature at or somewhat above the Curie temperature by pressing a master tape against the thermomagnetic layer on the slave tape at such a temperature. This causes the surface of the thermomagnetic layer to become cooled to a temperature below the Curie temperature by contact with the cool surface of the master tape. As the thermomagnetic layer cools to a temperature below the Curie temperature, the magnetic information on the master tape becomes transferred to the thermomagnetic layer on the slave tape. The information on the master tape thus becomes transferred in mirror form to the thermomagnetic layer on the slave tape without having to use any magnetic heads to write information on the slave tape.

There is at least one apparatus now in use for transferring information in magnetic form on a master tape to a thermomagnetic layer on a slave tape. Although this apparatus is fast, it is large, cumbersome and expensive, and it requires excessive electrical power. It is accordingly not economical to transfer images from a master tape to a slave tape by using the apparatus.

With the millions of copies that have to be made of a single movie such as the movie winning an Academy Award, it would be desirable to provide apparatus which is relatively inexpensive and which transfers information from a master tape to a slave tape in a minimal period of time and with low consumption of power. For example, it would be desirable to provide equipment which sells at most for a few thousand dollars and which reproduces a two (2) hour movie in approximately thirty (30) to sixty (60) seconds without any need for using magnetic reproducing heads. Because of the desire, and actually the need, for such apparatus, a considerable effort has been devoted, and a significant amount of money has been expended, to develop apparatus which meets such criteria. In spite of such effort and such money expenditure, no satisfactory apparatus meeting such criteria has been provided to this date.

Co-pending application Ser. No. 733,174 filed by Alfred M. Nelson and Robert P. Adams on Jul. 19, 1991, for a "Tape Duplicating System" provides apparatus which more than meets the criteria specified in the previous paragraph. It is able to record a two (2) hour movie in approximately thirty (30) to sixty (60) seconds such that the duplicated copy has the visual and audio fidelity of the original or master copy. It is compact so that it occupies relatively little space. This is important when a large number of apparatuses are used simultaneously in an enclosure such as a room to make duplicate copies. For example, the apparatus can be used to transfer the information on a master-master tape to a master tape, and subsequently the same apparatus can be used to transfer the information on the master tape to the slave tape, all without using recording heads. The apparatus also consumes low amounts of power.

In the apparatus disclosed and claimed in co-pending application Ser. No. 733,174, a master tape moves between first supply and take-up reels over a pinch roller. A slave tape moves between second supply and take-up reels over a capstan. First and second guides can be respectively constructed and adjustably positioned to regulate the movement of the master and slave tapes to aligned positions on the pinch roller and the capstan. A heater disposed between the capstan and the second guide heats only a thermomagnetic layer on the slave tape to at least the Curie temperature. The heater is adjustable in position to facilitate the movement of the slave tape to the aligned position on the capstan. A brake shoe between the capstan and the second supply reel controls the tape tension and damps any variations in the tension of the slave tape. A second brake shoe between the pinch roller and the first supply reel controls the tape tension and damps any variations in the tension of the master tape.

The pinch roller is movable to a first position and locked in position relative to the capstan, in which it abuts the capstan to facilitate the transfer of magnetic information from the master tape to the slave tape. In this disposition, the pinch roller locks the heater in a fixed position relative to the capstan. The pinch roller and the associated guide are movable to a second position displaced from the capstan to facilitate the disposition of the master tape on the pinch roller. The heater is pivotable relative to the capstan to facilitate the disposition of the slave tape on the capstan. The capstan, preferably of a unitary construction, receives forces to maintain the capstan rotational axis substantially constant.

Since the tapes pass over surfaces between the brake shoes and the capstan and the pinch roller, the tensions on the master and slave tapes are not as closely regulated at the position of transfer of the magnetic information from the master tape to the slave tape as might otherwise be desired. Specifically, the tapes pass over alignment guides which have a variable friction with time and physical conditions. This variable friction inhibits a precise regulation of the tape tensions at the abutting positions between the capstan and the pinch roller where the magnetic information is transferred to the slave tape.

In one embodiment of the invention, a master tape movable in a closed loop including a pinch roller transfers a mirror image to a slave tape movable in a closed loop including a capstan. A thermomagnetic layer on the slave tape has a Curie temperature above which magnetic information is destroyed and below which magnetic information can be recorded on such layer. The thermomagnetic layer is heated above the Curie temperature, thereby becoming lengthened by thermal expansion just before the slave tape reaches the capstan.

A downstream portion of a peripheral surface, preferably defining a cylindrical segment, on a first guide receives a pressurized fluid for sensing the tape tension in accordance with the tape width, distance from the cylinder axis and fluid pressure. An upstream portion of the guide peripheral surface receives a vacuum adjustable to regulate tape tension in response to variations in the pressurized fluid pressure.

In regulating the tape tension, the spacing between the slave tape and the peripheral surface at the downstream portion is controlled. The master tape is lengthened by a second guide having the same construction as the first guide to compensate for the slave tape lengthening by the heater and the first guide, thereby producing a mirror image on the slave tape after the slave tape has cooled to the ambient temperature.

Each of the master and slave tapes has a particular product of the Youngs modulus, tape width and tape thickness to provide a controlled strain on such tape when the tension on such tape is regulated.

This invention provides apparatus for, and methods of, regulating the tension of a master tape at a position contiguous to a pinch roller and for regulating the tension of a slave tape at a position contiguous to a heater, which is in turn contiguous to a capstan. The apparatus and method of this invention are adapted to be used in the apparatus and method of co-pending application Ser. No. 733,174 and to constitute an improvement in the apparatus and method of copending application Ser. No. 733,174. The invention also provides a master tape and a slave tape which may be constructed especially for the apparatus and method of this invention to obtain all of the advantages provided by the apparatus and method of this invention.

In the drawings:

FIG. 3 is an enlarged perspective view of braking apparatus associated with a supply reel or cassette (also shown in FIG. 1) for controlling the unwinding of a tape from the supply reel;

FIG. 4 is an enlarged plan view of a guide means (also shown in FIG. 1) for regulating the tension of the tape at a position contiguous to a pinch roller which receives the master tape and provides for a mirror transfer of the image on the master tape to a slave tape;

FIG. 6 is an enlarged schematic elevational view of the external surface of the guide means (also shown in FIG. 1, 4 and 5) associated with the master tape;

FIG. 7 is an enlarged schematic elevational view of the external surface of the guide means (also shown in FIG. 1) associated with the slave tape, the guide means associated with the slave tape being constructed in a manner similar to the construction of the guide means associated with the master tape;

FIG. 8 is an enlarged perspective view of a portion of the apparatus included in FIG. 1 and specifically illustrates the construction of a guide pin, the guide means shown in FIGS. 4 and 6 and a pinch roller and the disposition of these members in the path of movement of the master tape;

FIG. 8A is an enlarged perspective view of the external surface of the guide means shown in FIG. 8;

FIG. 9 is an enlarged fragmentary sectional view taken substantially on the line 9—9 of FIG. 8 and illustrates in additional detail the construction of the guide means for the master tape at the input end of the guide means in the direction of movement of the master tape;

FIG. 10 is an enlarged fragmentary sectional view taken substantially on the line 10—10 of FIG. 8 and illustrates additionally the construction of the guide means;

FIG. 11 is an enlarged fragmentary sectional view taken substantially on the line 11—11 of FIG. 8 and illustrates in further detail the construction of the guide pin for the master tape in the direction of movement of the master tape;

FIG. 24 is an enlarged fragmentary sectional view taken substantially on the line 24—24 of FIG. 22 and illustrates the construction of the pivot assembly for pivoting the heater assembly between a position with the heater receiving the slave tape and a withdrawn position and further illustrates the members for tilting the heater assembly relative to the capstan;

FIG. 25 is an enlarged fragmentary sectional view taken substantially on the line 25—25 of FIG. 24 and illustrates in additional detail the construction of the members for tilting the heater assembly relative to the capstan;

FIG. 26 is an enlarged fragmentary view taken substantially on the line 26—26 of FIG. 24 and illustrates in further detail the construction of the members for tilting the heater assembly relative to the capstan;

FIG. 30 is a perspective view of the heater for instantaneously heating the thermomagnetic layer on the slave tape to a temperature above the Curie temperature;

FIG. 31 is an enlarged fragmentary sectional view taken on the line 31—31 of FIG. 30 and illustrates the different layers of material which are disposed on an electrically insulating support member to form one embodiment of the heater;

FIG. 32 is an enlarged sectional view taken substantially on the line 32—32 of FIG. 31 and illustrates additional details of the embodiment of the heater shown in FIG. 31;

FIG. 33 is an enlarged fragmentary sectional view corresponding to the view shown in FIG. 31 and illustrates a modification of the heater shown in FIG. 31;

FIG. 34 is an enlarged fragmentary sectional view taken substantially on the line 34—34 of FIG. 30 and illustrates a modification to the embodiment shown in FIG. 31;

Figure 5:
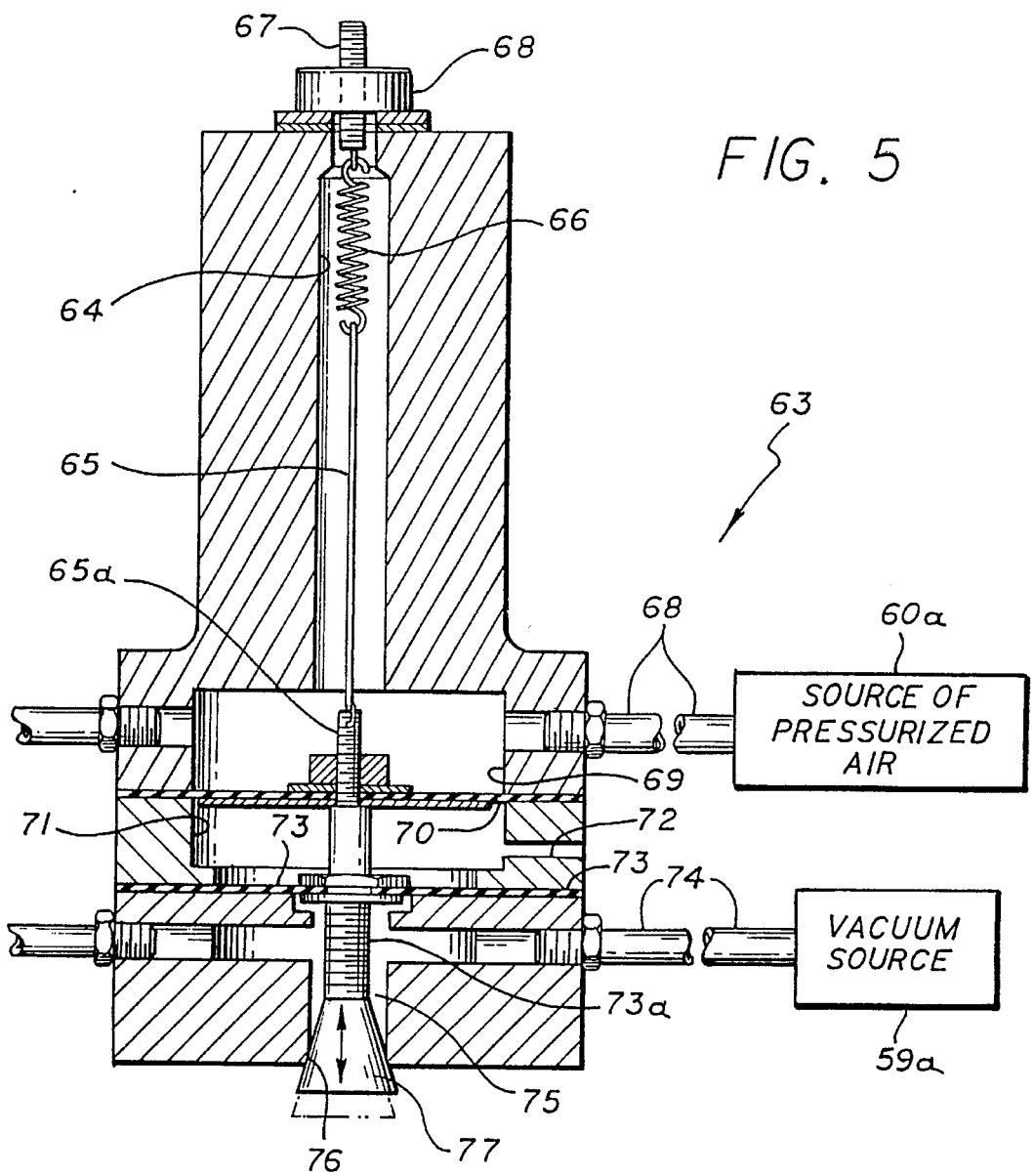
FIG. 5 is an enlarged sectional view of apparatus associated with the guide means shown in FIG. 4 for operating in conjunction with the apparatus shown in FIG. 4 for regulating the tension on the master tape at the position contiguous to the pinch roller.
Figure 43:
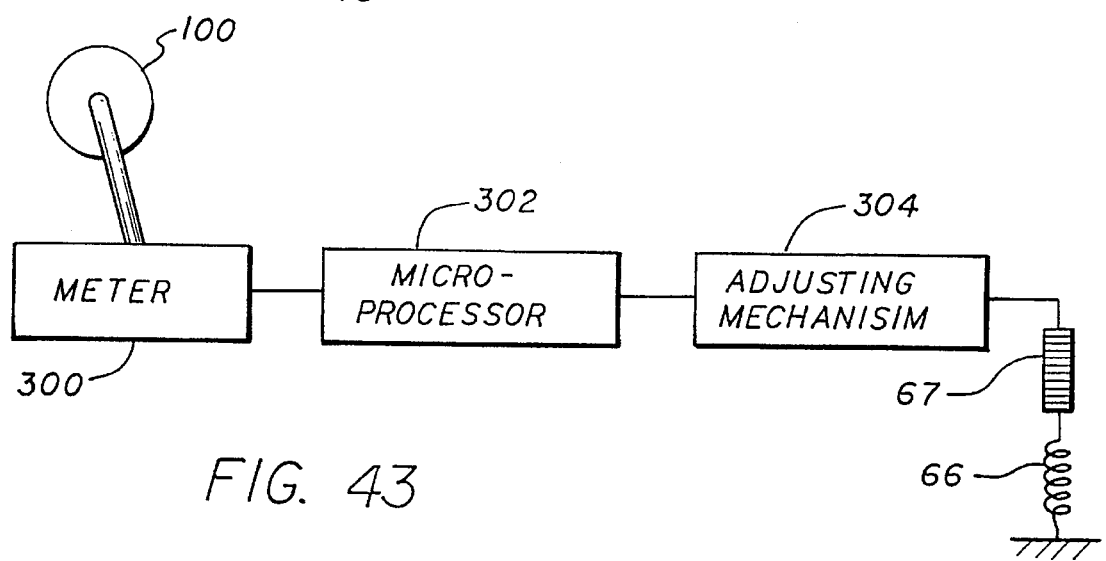
Figure 40:
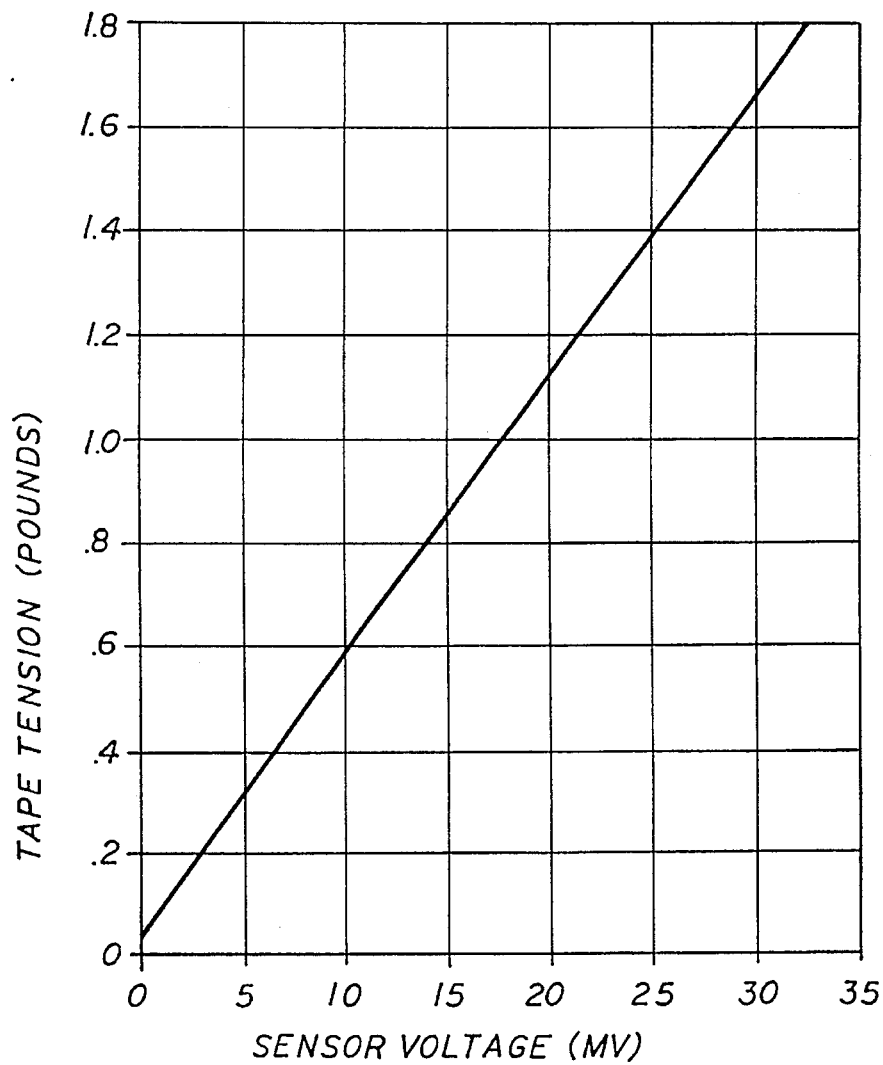
Figure 41:
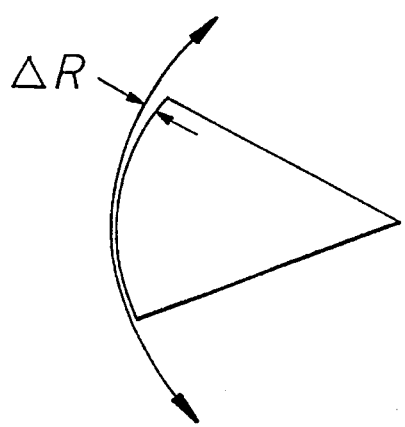
Figure 42:
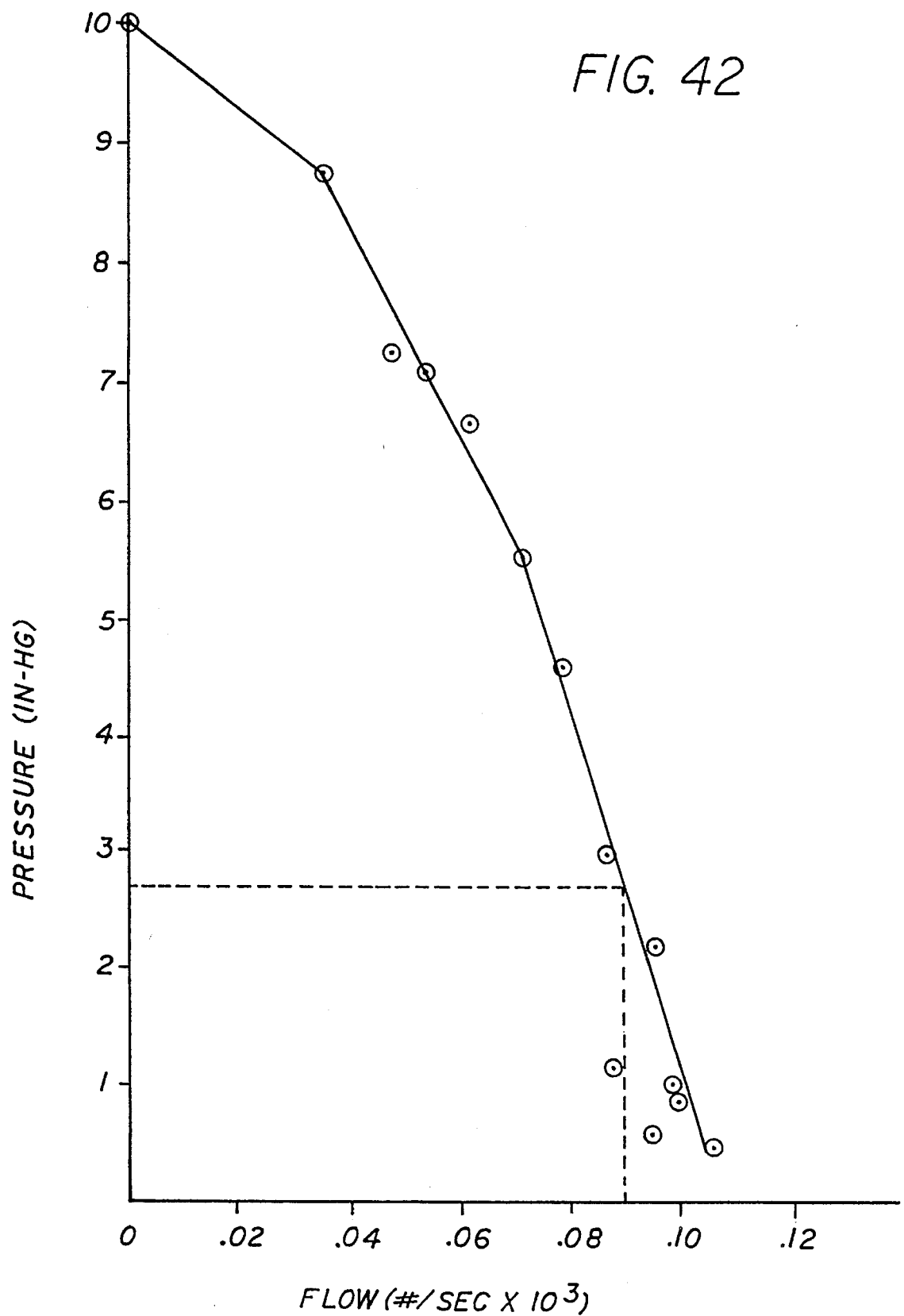

FIG. 40 provides a curve illustrating the relationship between tape tension and a parameter such as a sensor voltage for presetting the apparatus shown in FIG. 5 to regulate the tension on the guide means shown in FIG. 4;

FIG. 41 schematically illustrates the disposition of the master tape on the periphery of the guide means shown in FIG. 4 when the tension of the tape has been regulated to a preselected value, FIG. 42 provides a curve showing the relationship between the flow of air under pressure to the periphery of the guide means shown in FIG. 4 and the pressure of the air providing such flow; and FIG. 43 is a schematic diagram, partly in block form, of apparatus for determining the characteristics of a tape (either master or slave) and for setting the constraint of a spring shown in FIG. 5 to provide a particular strain or tension on the master or slave tape during the process of transferring information from the master tape to the slave tape.

The apparatus of this invention is intended to constitute an improvement of the apparatus disclosed and claimed in co-pending application Ser. No. 733,174. Many of the drawings of this application are identical, or substantially identical, to corresponding drawings in co-pending application Ser. No. 733,174. Because of this, if there is any deficiency in the drawings or disclosure of this application, the drawings and disclosure of co-pending application Ser. No. 733,174 are intended to complete the disclosure of this application.

Figure 38:
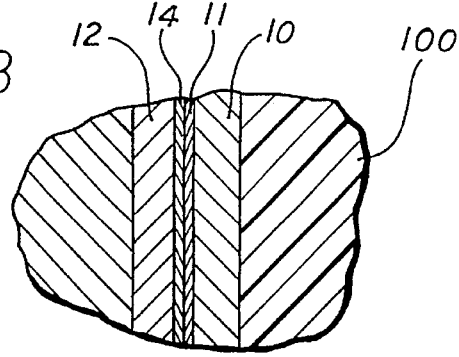
FIG. 38 is a fragmentary sectional view, enlarged with respect to FIG. 37, of the portion of the members within the broken circle designated by the numeral "38" in FIG. 37 and particularly illustrates the abutting relationship of the magnetic layer on the master tape and the thermomagnetic layer on the slave tape.
Figure 37:
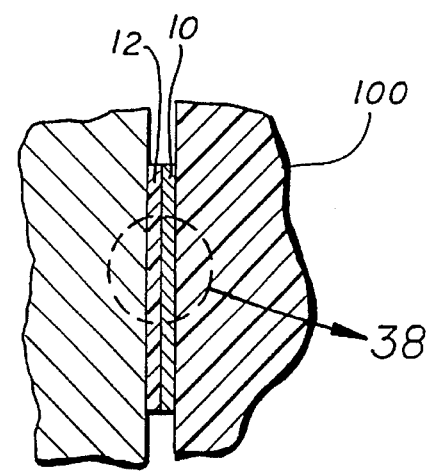
FIG. 37 is an enlarged fragmentary sectional view taken substantially on the line 37—37 of FIG. 35 and illustrates a portion of the pinch roller and the capstan and the master and slave tapes with the master and slave tapes in abutting relationship to each other and to the pinch roller and the capstan.

In one embodiment of the invention, a master tape 10 (FIG. 1) is provided with a mirror image of information such as visual pictures and aural sound to be produced on a slave tape 12. Preferably the mirror image of the visual and aural information is recorded in magnetic form on the master tape 10. The mirror image may be recorded in either analog or digital form. The visual and aural information may be provided in a layer 11 (FIG. 38) of a magnetizable oxide such as an iron oxide on the surface of the backing member of the master tape. The magnetizable oxide 11 may be formed in a conventional manner on the master tape 10.

A slave tape 12 (FIGS. 1 and 38) preferably has a thermomagnetic layer 14 (FIG. 38) on the tape. The thermomagnetic layer 14 may be formed on the backing member of the slave tape 12 from a suitable material such as chromium dioxide in a manner well known in the art. The thermomagnetic layer 14 preferably has a Curie temperature above which magnetic information in the thermomagnetic layer is destroyed and below which the magnetic information on the master tape can be duplicated in the mirror image on the thermomagnetic layer 14 on the slave tape. Preferably the duplication occurs at a temperature close to, but below, the Curie temperature. When this occurs, the duplication can occur by pressing the master and slave tapes together and can occur without any need to provide magnetic heads for recording the magnetic information from the master tape 10 on the slave tape 12. It will be appreciated that the magnetic layer 11 on the master tape 10 may also be formed from a thermomagnetic material.

As will be described, one of the features of this invention is that the tension of the master tape and the tension of the slave tape are respectively regulated at particular values at positions respectively near the positions where the information on the master tape is transferred in a mirror image to the slave tape. Another feature of this invention is that each of the master tape and the slave tape is provided with particular characteristics so that the strain (the elongation in inches per inch) on each slave tape is maintained at a first particular value and the strain on each slave tape is maintained at a second particular value. These strains are chosen so that a precise image is recorded by each master tape in a mirrored form on each slave tape when the slave tape has cooled to an ambient temperature. This provides for an accurate playback of the image on a VCR machine with a high resolution.

Figure 1:
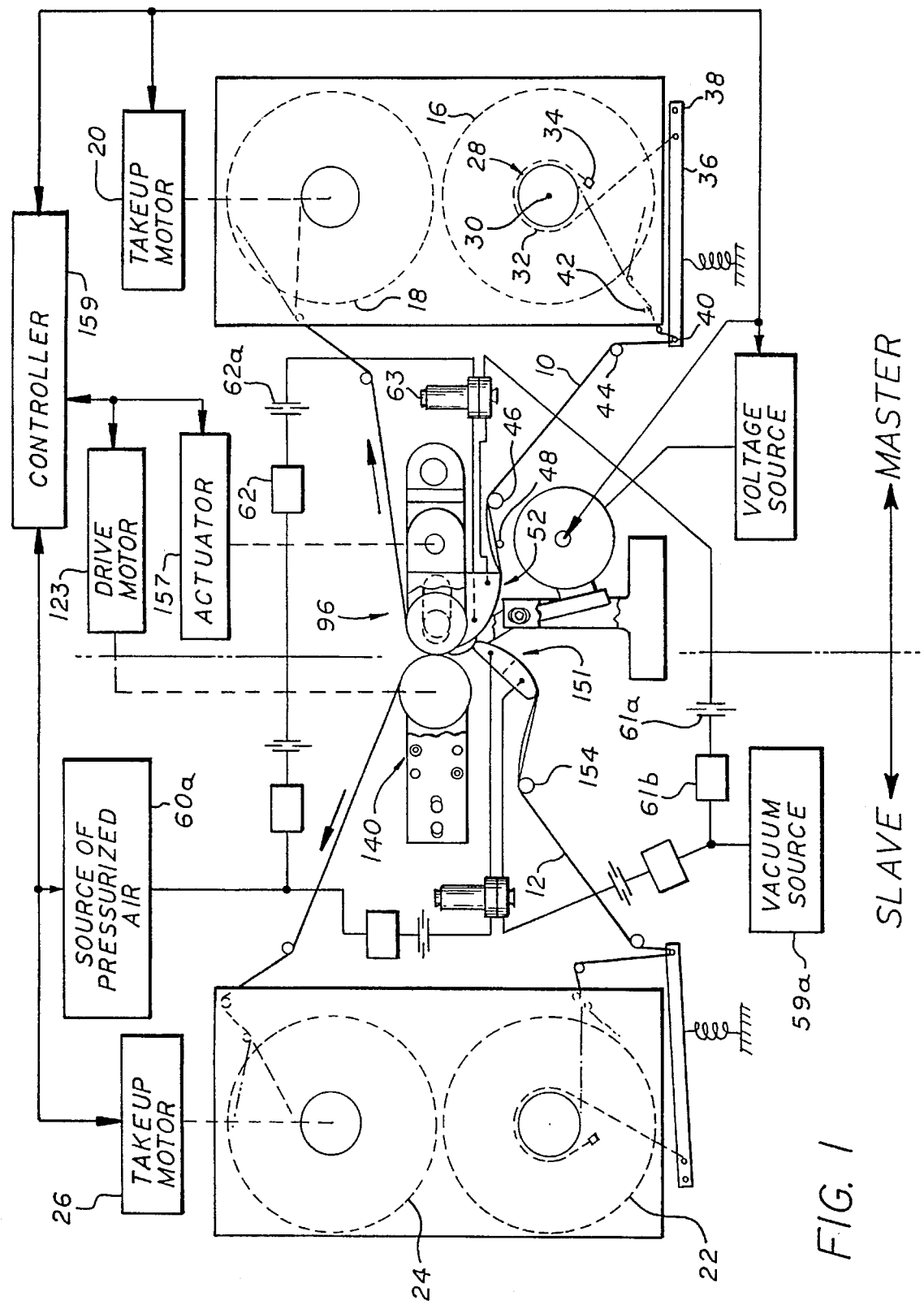
FIG. 1 is a schematic plan view, partly in block form, of one embodiment of apparatus for transferring the information, preferably in magnetic form, on a master tape to a slave tape.
Figure 2:
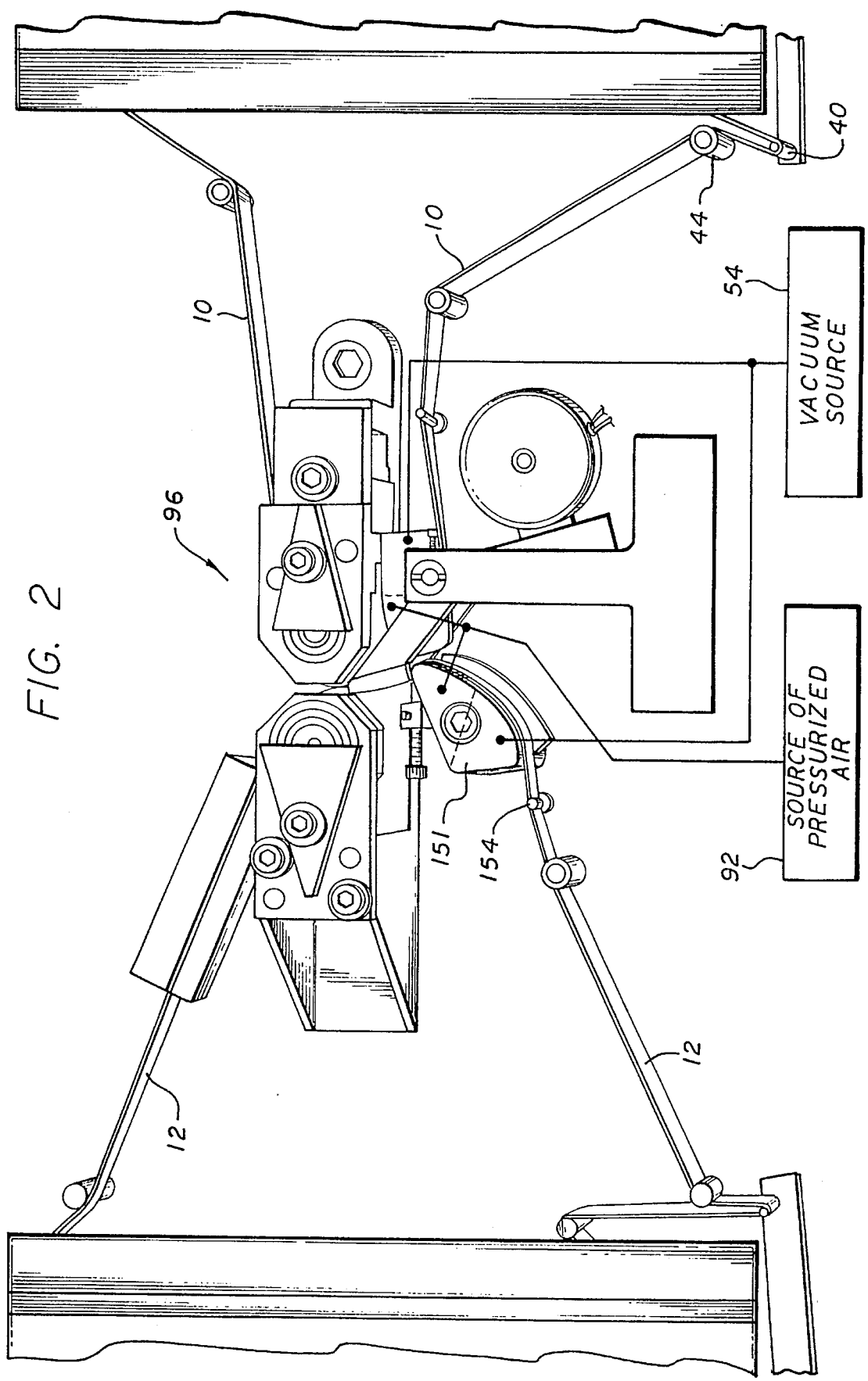
FIG. 2 is an enlarged perspective view of a portion of the apparatus shown in FIG. 1 and illustrates this portion of the apparatus in additional detail, this portion including the members adjacent to and including the position where the information on the master tape is transferred to the slave tape.

The master tape 10 can be initially wound on a supply reel or cassette 16 and can then be unwound from the supply reel or cassette 16 and wound on a take-up reel or cassette 18. The unwinding of the master tape 10 from the cassette 16 by a capstan motor 123 (FIG. 1) and the winding of the master tape on the cassette 18 can occur through the operation of a take-up motor 20 (FIG. 1). The cassettes 16 and 18 and the take-up motor 20 can be constructed in a conventional manner as in a video cassette reproducer found in many homes. Similarly, a supply reel or cassette 22, a take-up reel or cassette 24 and a take-up motor 26 can be provided for the slave tape 12.

An annular control member 28 (FIGS. 1 and 3) is disposed in a concentric relationship with the cassette 16 on a shaft 30. A strap 32 is wound partially around the annular control member 30 and is attached at one end as at 34 to a mechanical ground. At the other end, the strap 32 is attached to an intermediate position on a rod 36 which is pivotable at one end as at 38. At its other end, the rod 36 has a pin 40. The construction and arrangement of the annular control member 28, the shaft 30, the strap 32 and the rod 36 are well known in the art of video cassette recording and reproducing equipment. A similar arrangement may also be provided in association with the supply reel or cassette 22.

The master tape 10 extends from the cassette 16 over a pin 42, the pin 40 on the rod 36, a pin 44, a post 46 (FIG. 1) and a guide pin 48 (FIGS. 1, 8, and 11) to the peripheral surface 50 of an alignment guide generally indicated at 52. The peripheral surface 50 of the alignment guide 52 is inclined at a small angle (FIG. 9) at its upstream end. This small angle causes the tape to ride down to ledge 53, thus accurately aligning the tape to the ledge height. The guide pin 48 is tilted to provide compensation for the differential strain introduced by the inclined surface 50 of the alignment guide 52. The optimum tilt angle is a function of the wrap angle, the tension of the tape, and the slope of the alignment guide 52. If the tilt is too large, the tape will ride upwardly off the ledge of the alignment guide at the input end. If the tilt is too small, excessive force will be created on the tape edge. This can result in a buckling of the tape at the input end of the alignment guide 52 and wear of the ledge 53.

At the downstream end of the guide 52, the slope of the guide face on the alignment guide 52 transitions to a perpendicular relationship with the pinch roller. This is indicated at 55 in FIG. 10. Thus the tape exits the guide in a plane parallel to the pinch roller axis and without differential strain. The inclined surface 50 and the perpendicular surface 55 are undercut as at 54 (FIGS. 8A, 9 and 10) to assure that the tape will have a planar disposition along the inclined and perpendicular surfaces.

The guide 52 may be hollow and may be provided with an internal wall as at 56 at an intermediate position to define a pair of isolated chambers 57 and 58 (FIG. 4). The chamber 57 is upstream from the chamber 58 in the direction of movement of the master tape 10. The guide 52 may be provided with a pair of peripheral surfaces 59 and 60 which are continuous with each other. Preferably the peripheral surfaces 59 and 60 define a segment of a cylinder for advantageous reasons which will become apparent subsequently. Orifices 61 communicate the chamber 57 with the peripheral surface 59 and orifices 62 communicate the chamber 58 with the peripheral surface 60. A variable vacuum is produced in the chamber 57 and a fluid (e.g. air) under a variable pressure is introduced to the chamber 58. The variable vacuum may be produced by a vacuum source 59a (FIGS. 1 and 5) and the air under pressure may be obtained from a source 60a (FIGS. 1 and 5). A reservoir 61b and an orifice 61a may be disposed between the vacuum source 59a and the chamber 57. Similarly, a reservoir 62 and an orifice 62a may be disposed between the source 60a and the chamber 58.

The variable vacuum in the chamber 57 and the variable pressure above atmospheric pressure in the chamber 58 are produced by the valving mechanism generally indicated at 63 in FIG. 5. The valving mechanism 63 includes a tube 64 closed at one end (e.g. the upper end) in FIG. 5. A constraining member such as a spring 66 is attached at one end to the closed end of the tube 64 and at the other end to a rod 65. The spring 66 constrains the rod 65 for movement in an upward direction. An arrangement including a screw 67 and an adjustable nut 68 are provided at the closed end of the tube 64 to adjust the constraint on the spring 66. The upper end of the spring 66 is attached to the bottom end of the screw 67 to provide for the adjustment in the constraint of the spring when the screw 67 is turned in the nut 68.

Air under a variable pressure is introduced through a conduit 68 from the source 60a of pressurized air to a first chamber 69 which may be isolated from the tube 64. An extension 65a of the rod 65 extends through the chamber 69 and through a resilient diaphragm 70 in sealed relationship to the chamber 69. The diaphragm 70 is coupled to the rod 65 for movement upwardly and downwardly in accordance with the movement of the piston. The diaphragm 70 defines one end of a second chamber 71 which receives air at atmospheric pressure through a conduit 72. The opposite end of the chamber 71 is defined by a resilient diaphragm 73 which is sealed to a piston 73a for movement with the piston. The piston 73a is suitably attached to the rod extension 65a.

A variable vacuum is introduced from the vacuum source 59 through a conduit 74 to a third chamber 75 which is isolated from the second chamber 71 by the resilient diaphragm 73. The vacuum chamber 75 is open at one end (e.g. the bottom end in FIG. 5) to define a valve seat 76. A valve rod 77 preferably having a conical configuration defines with the valve seat 76 a valve having a variable leakage to the atmosphere in accordance with the vertical positioning of the valve rod relative to the valve seat. The valve rod 77 constitutes an extension of the piston 65.

The spring 66 is provided with characteristics to produce a particular tension on the master tape 10 as the master tape moves along the peripheral surface 60 (FIG. 4) of the guide 52. This tension provides a displacement of the master tape 10 from the peripheral surface 60 of the guide 52. This is indicated by the distance AR in FIG. 41. The magnitude of this tension determines the radial distance R+ΔR of the displacement of the tape 10 from the axis of the peripheral surface 60 of the guide 52. As the radial distance AR between the master tape 10 and the peripheral surface 60 of the guide 52 increases, an increased amount of the air under pressure is able to escape from the chamber 58 through the orifices 62 and into the atmosphere through the space between the master tape 10 and the peripheral surface 60 of the guide 52. This causes the pressure of the air passing from the source 60 of pressurized air through the conduit 68 to the chamber 69 (FIG. 5) to decrease.

The decreased pressure of the air in the chamber 69 (FIG. 5) causes the force exerted downwardly by the air in the chamber 69 to decrease. Because of this, the force exerted upwardly by the spring 66 on the rod 65 becomes dominant so that the rod is moved upwardly in FIG. 5. This causes the opening between the valve rod 77 and the valve seat 76 to decrease such that an increased vacuum is produced in the chamber 75. This increased vacuum results only from the force of the spring 68 since the force exerted downwardly on the rod 65 by the diaphragm 73 is equal and opposite to the force exerted upwardly on the rod 77 by the atmospheric pressure below the rod. This results from the fact that the area of the diaphragm 73 is equal to the area of the valve seat 76. This increased vacuum is also introduced to the chamber 57 in FIG. 4.

Figure 18:
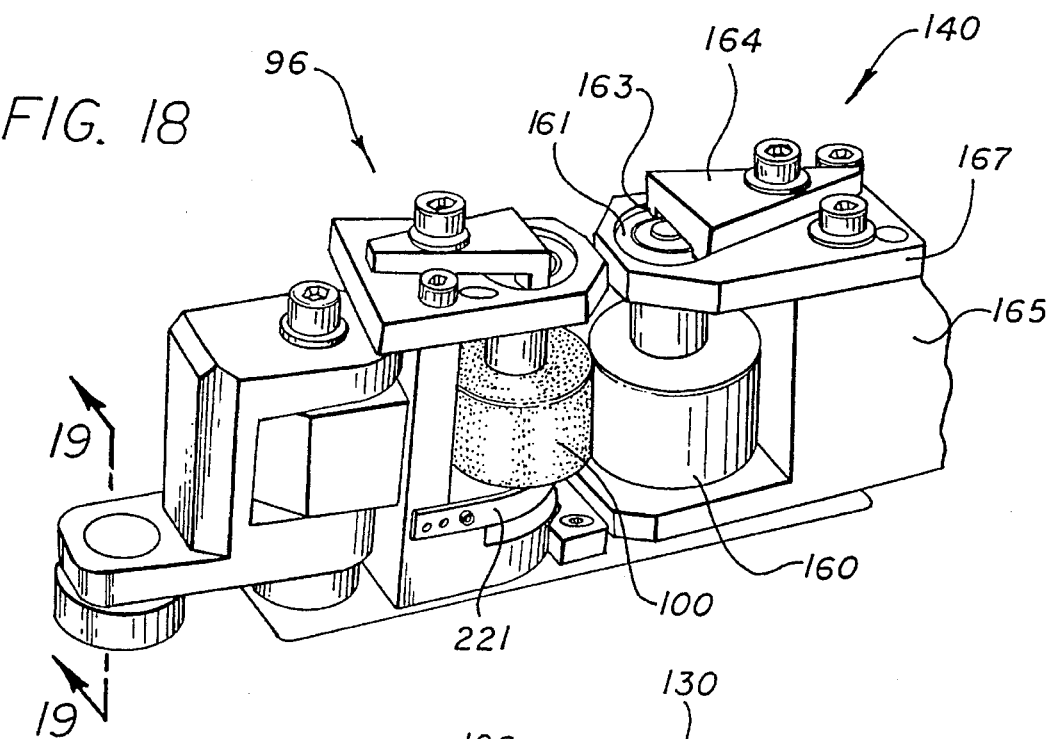
FIG. 18 is an enlarged perspective view of the pinch roller and the associated guide means and the capstan assembly, as seen from a position above and in front of these members, when the pinch roller and the guide means have been extended to the position of the pinch roller abutting the capstan.
Figure 19:
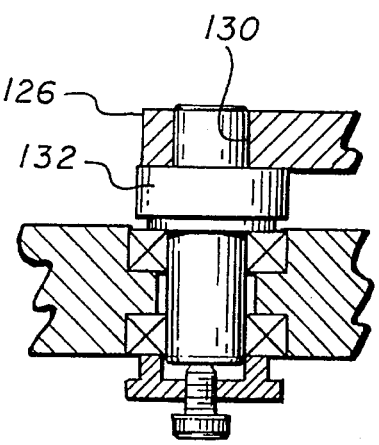
FIG. 19 is an enlarged fragmentary sectional view taken substantially on the line 19—19 of FIG. 18 and illustrates the construction of an assembly for providing for the movement of the pinch roller and the associated guide means between the withdrawn and extended positions.
Figure 20:
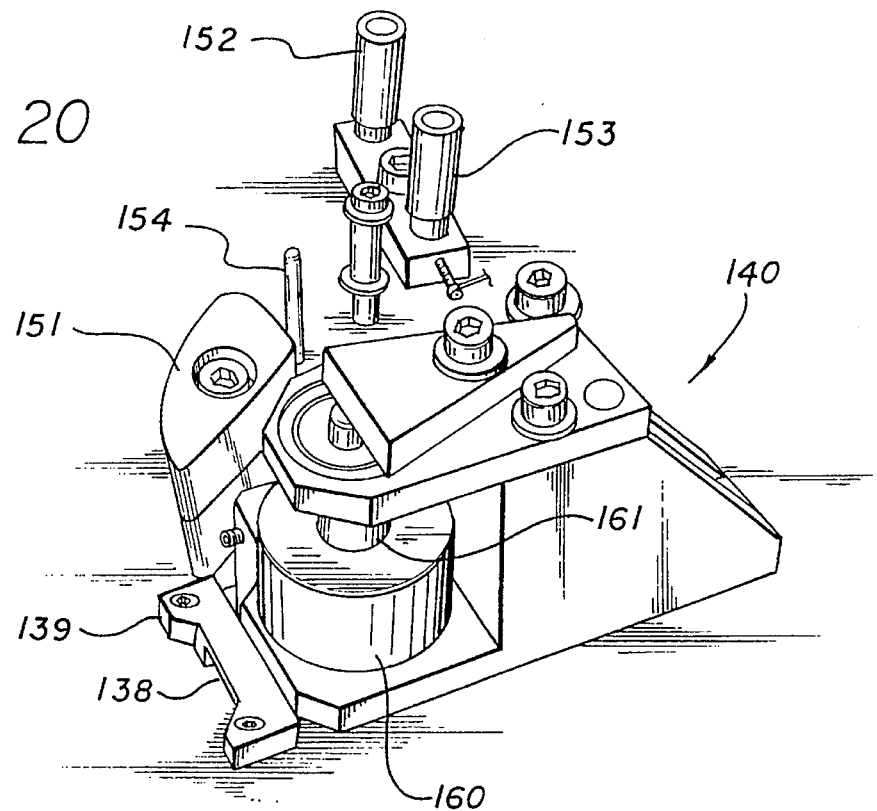
FIG. 20 is an enlarged perspective view of the capstan assembly and associated members, including associated guide means, for guiding the movement of the slave tape to the capstan, the view being provided from a position above and to one side of these members.
Figure 21:
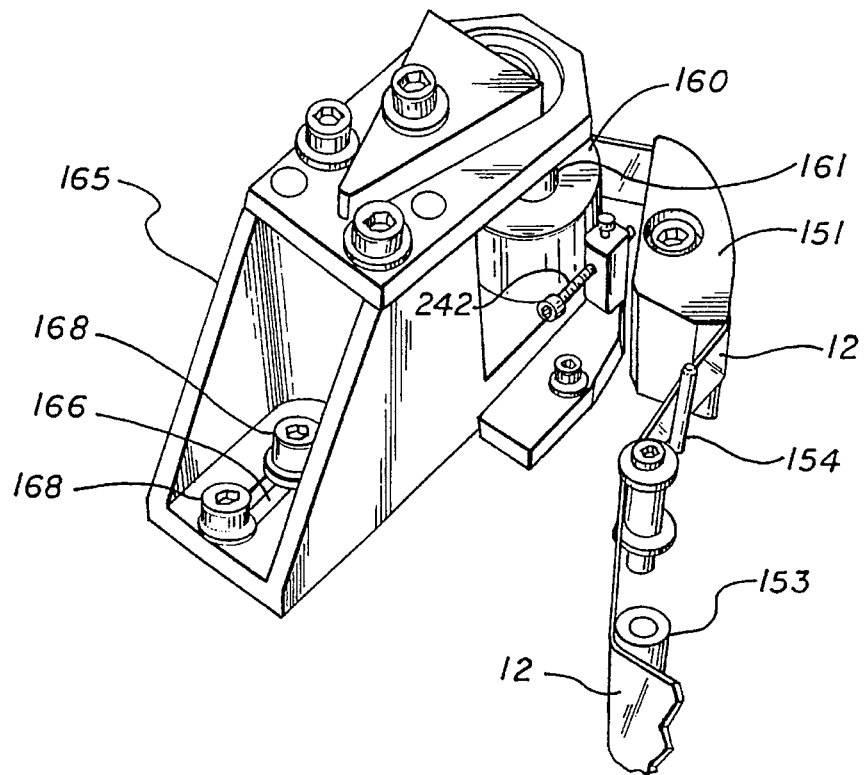
FIG. 21 is an enlarged perspective view of the capstan assembly and the associated members, including the associated guide means shown in FIG. 20, as seen from a position above and to the other side of these members, and also shows a disposition of the slave tape on these members.

The increased vacuum in the chamber 57 (FIG. 4) produces an increased force on the master tape 10 in a direction to position the tape firmly on the peripheral surface 59 of the guide 52 as the tape moves on such peripheral surface. This increased force produces an increased friction between the master tape 10 and the peripheral surface 59 of the guide 52. The tape 10 is pulled at a constant speed by a capstan 160 in proximity with a pinch roller 100 (FIG. 18) and the increased friction of the tape with respect to the peripheral surface causes an increased tape tension. This increased tension on the master tape 10 produces a decrease in the spacing between the master tape 10 and the peripheral surface 60 of the guide 52. The decreased spacing between the master tape 10 and the peripheral surface 60 of the guide 52 provides for an increase in the pressure of the fluid passing from the source 60a of pressurized air through the conduit 68 to the chamber 69 in FIG. 5.

The increased pressure of the fluid in the chamber 69 results in a downward movement of the rod 65 to open the valve defined by the rod 77 and the valve seat 76. The opening of this valve causes the vacuum introduced to the chamber 57 to decrease, thereby decreasing the frictional force produced on the master tape 10 on the peripheral surface 59 of the guide 52. In this way, the tension of the master tape 10 is regulated at a value dependent upon the constraint provided by the setting of the spring 66.

As will be seen from the above discussion, the tape tension sensor may be considered to be produced by an air bearing between the tape 10 and the peripheral surface 60 of the tape. Since the tape 10 does not touch the peripheral surface 60 of the guide 52, there is no frictional retarding force on the tape 10 as the tape moves along this peripheral surface. The tape tension sensed is accordingly a true representation. The variables affecting the pressure sufficiently only to lift the tape 10 slightly from the peripheral surface 60 may be intuitively, but not vigorously, seen from the following analysis.

The air pressure sufficient in the tape sensor to lift the tape 10 slightly from the peripheral surface 60 is proportional to the tape tension since the normal force caused by the tape tension must be overcome linearly by the air pressure. The air pressure sufficient to lift the tape 10 is inversely proportional to the area of the tape in contact with the tape tension sensor since an air pressure over an increased area will overcome an increased normal force (and hence tape tension).

If the convex surface receiving the tape 10 is a section of a cylinder (as is the peripheral surface 60 in FIG. 4), the area of the tape 10 in contact with the tape tension sensor is proportional to the radius of the cylindrical segment defined by the peripheral surface 60 of the guide 52 (because the radius of the cylindrical segment is proportional to the circumference of the cylindrical segment and the tape width is constant). Furthermore, the area of the tape 10 is proportional to the width of the tape.

In view of the above, $$V = KT/WR, \text{ where} \tag{1}$$

P=the air pressure at the peripheral surface 60;

K=a constant;

T=the tension of the tape 10 at the peripheral surface 60;

W=the width of the tape 10;

R=the radius defined by the tape 10 with respect to the axis of the cylindrical configuration of the peripheral surface 60

The constant K happens to be equal to the integer "1".

Solving for T in equation (1)

$$T = PRW \tag{2}$$

Thus, the tension of the tape 10 is proportional to the product of the width of the tape 10, the radius of the tape with respect to the axis of the peripheral surface 60 of the guide 52 and the air pressure at the peripheral surface 60. As previously described, the air pressure is dependent upon the spacing between the tape 10 and the peripheral surface 60 of the guide 52.

The following is a more vigorous analysis to determine the tension T of the master tape 10 than that specified above in equations (1) and (2). Assume that the tension sensor has the shape of a cylinder with a radius R and the tape 10 rides over a sector (in radius) of the cylindrical surface defined by the tape sensor. Assume also that there is a chamber within this cylindrical surface and that this chamber (e.g. the chamber 58 in FIG. 4) has a pneumatic pressure which is positive with respect to atmospheric pressure. Assume further that there are a multiplicity of orifices (e.g. the orifices 62 in FIG. 4) communicating between the chamber (e.g. the chamber 58) and the peripheral surface (e.g. the surface 60) and that all of these orifices are under the tape 10.

On the basis of the assumptions in the previous paragraph, for a particular tape tension T, there is within the chamber (e.g. the chamber 58) a particular pressure P which will lift the tape slightly above the cylindrical surface (e.g. the surface 60). This slight distance can be designated as $\Delta R$ as shown schematically in FIG. 41. This increase $\Delta R$ in the radial distance of the tape 10 from the peripheral surface 60 of the guide 52 causes an increase $\Delta L$ to occur in the length of the tape 10 over the sector $\phi$ defined by the peripheral surface 60. Then the energy required to move the tape 10 the distance $\Delta L$ against the action of the tape tension T equals the energy required to increase the volume of air by the increment $\Delta V$ under the tape 10 at an air pressure P.

The relationship discussed in the previous paragraph can be expressed as $$T\Delta L = P\Delta V \quad (3)$$

The increase $\Delta L$ in the length of the tape 10 over the sector B can be expressed as $$\Delta L = \beta(R+\Delta R) - \beta R \quad (4)$$

where $\beta$ is the angle of tape rap over the sector expressed in radians. Equation (4) can be simplified to $$\Delta L = B\Delta R \quad (5)$$

$\Delta V$ can be expressed as $$\Delta V = [W\pi(R+\Delta R)(R+\Delta R)(B/(2\pi))] - [W\pi RR(\beta/(2\pi))] \quad (6)$$

Equation (6) indicates the difference in volume over the sector for a radius $(R+\Delta R)$ and for a radius $(R)$. Equation (6) can be simplified to $$\Delta V = W\beta(R\Delta R + \Delta R\Delta R) \quad (7)$$

If R is assumed to be considerably greater than $\Delta R/2$ equation (7) can be simplified to $$\Delta V = W\beta R\Delta R \quad (8)$$

Substituting in equation (8) the value of $\Delta V$ obtained from equation (3), $$(T\Delta L)/P = W\beta R\Delta R \quad (9)$$

Substituting equation (5) in equation (9), $$(T\beta\Delta R)/P = W\beta R\Delta R \quad (10)$$

Equation (10) may be simplified and transposed to obtain $$T = WRP \quad (11)$$

As will be seen, equation (11) from a rigorous analysis corresponds to equation (2) from a simplified analysis. In accordance with equation 11, the tension of the tape 10 is equal to the product of the width of the tape, the radius of the tape to the axis of the peripheral surface 60 of the guide 52 and the pressure of the air at the peripheral surface 60.

FIG. 40 illustrates the relationship between the sensor voltage used to preset the spring 65 and the tension of the master tape 10 in pounds. This relationship is used to preset the compression of the spring 65 so that a proper tension is applied to the master tape 10 to obtain an optimal operation of the system of this invention. There is a tendency to preset the tension of the spring 65 to the middle of the range shown in FIG. 40.

FIG. 42 illustrates the relationship between the flow of air under pressure through the orifices 62 in the peripheral surface 60 of the guide 52 and the pressure of such air. The flow is shown along the horizontal axis and is in pounds per second times one thousand ($\#10^3$/sec). The pressure is in inches of mercury (in-Hg). There is a tendency to provide the setting in the middle of the range shown in FIG. 42.

As will be appreciated, it would be desirable not to have to change the set point for the tension of the master tape 10 with each new batch of master tape. This may be accomplished as shown by the following analysis. The cross sectional area of the tape 10 is the width W of the tape multiplied by the thickness of the tape. The tension of the master tape 10 divided by the cross sectional area of the tape constitutes the stress S on the tape 10. The stress S equals a constant E (constituting the Youngs Modulus) times the strain e, which is equal to the change in the length of the tape 10 divided by the length of the tape.

The requirements for manufacturing the master tape 10 can be computed as follows: As will be seen from the previous paragraph, $$S = Ee, \text{ where} \quad (11)$$

S = the stress on the tape 10;
E = the Youngs Modulus of the tape 10; and
e = the strain on the tape 10.

The stress S on the tape 10 can also be written as $$S = T/Wd, \text{ where} \quad (12)$$

T = the tension of the tape 10;
W = the width of the tape 10; and
d = the thickness of the tape 10.

By substituting equation (12) in equation (11)

$$Ee = T/Wd \quad (13)$$

Solving equation (13) for the strain e on the tape 10, $$e = T/WdE \quad (14)$$

In order to maintain the set point for the tension of the master tape 10 substantially constant, the manufacturer of the master tape 10 has to maintain the strain e substantially constant. Thus, the manufacturer has to maintain the product EWd substantially constant. In other words, the manufacturer has to maintain the product of the width, thickness and Youngs modulus of the master tape 10 substantially constant. The width W of the tape 10 is generally maintained substantially constant for other reasons. For example, it is desirable to maintain the width W of the master tape 10 substantially constant so that in some prior art duplicators the master tape will be positioned properly on the capstan when the mirror image is transferred from the master tape 10 to the slave tape 12. If the width W of the master tape 10 is maintained substantially constant, the manufacturer of the master tape 10 has to meet the following requirement:

$$Ed = \text{a constant} \quad (15)$$

Applicants believe that a tape meeting these requirements has never been provided in the prior art and that, accordingly, a tape meeting these requirements is patentable.

The Youngs modulus of the master tape 10 may be varied by heating the tape 10 to an elevated temperature below the temperature at which the tape loses its shape. The tape is then stretched longitudinally and/or laterally. The stretching may be provided progressively in successive operations with each operation providing additional stretching. The amount of tape stretching in the longitudinal and lateral directions controls the Youngs modulus of the tape longitudinally and laterally. It is known in the prior art to stretch tapes longitudinally and laterally to control the Youngs modulus of the tape. The thickness of the tape can be controlled by varying the aperture of the extrusion. It is known in the prior art to control the thickness of the tape.

The guide 52 is preferably disposed in contiguous relationship to a pinch roller 100 so that the tension of the tape is precisely regulated when the tape becomes disposed on the periphery of the pinch roller. The guide 52 (FIGS. 12–13) is coupled as by bolts 98 to a pinch roller assembly generally indicated at 96. The pinch roller assembly 96 includes the pinch roller 100. The guide 52 is adjustably positioned relative to the pinch roller 100 as by a pair of eccentrics 104 and 106 (FIGS. 12, 12A, 12B and 13). The eccentric 104 may be operative to move the guide 52 vertically in accordance with the rotation of the eccentric. The eccentric 106 may be operative to move the guide 52 vertically so as to adjust the tilt of the guide relative to the pinch roller 100. It is believed that the construction of eccentrics such as the eccentrics 104 and 106 are well known to persons of ordinary skill in the art. Furthermore, the construction of the eccentric 106 may correspond to the construction of the eccentric shown in FIGS. 24–26. Although the construction of the eccentrics 104 and 106 is considered to be well known in the art, the use of such eccentrics in a pinch roller assembly is not believed to be known in the art.

The pinch roller 100 may be molded on a shaft 108 and may be constructed from a suitable material such as a polyurethane. Polyurethane is a desirable material because it has very good wear characteristics and because it takes only a minimal permanent set from continued pressure from a capstan abutting the pinch roller in the operative relationship of the pinch roller and the capstan. Polyurethane is also desirable from the standpoint of its ability to adhere to the shaft 108 and also from the standpoint of having a low hysteresis in resisting the effects of heat. A suitable polyurethane for use as the pinch roller 100 may be obtained from Harkness in Bristol, Conn. This polyurethane may have a hardness of 60 Shorr on the A scale.

Figure 13:
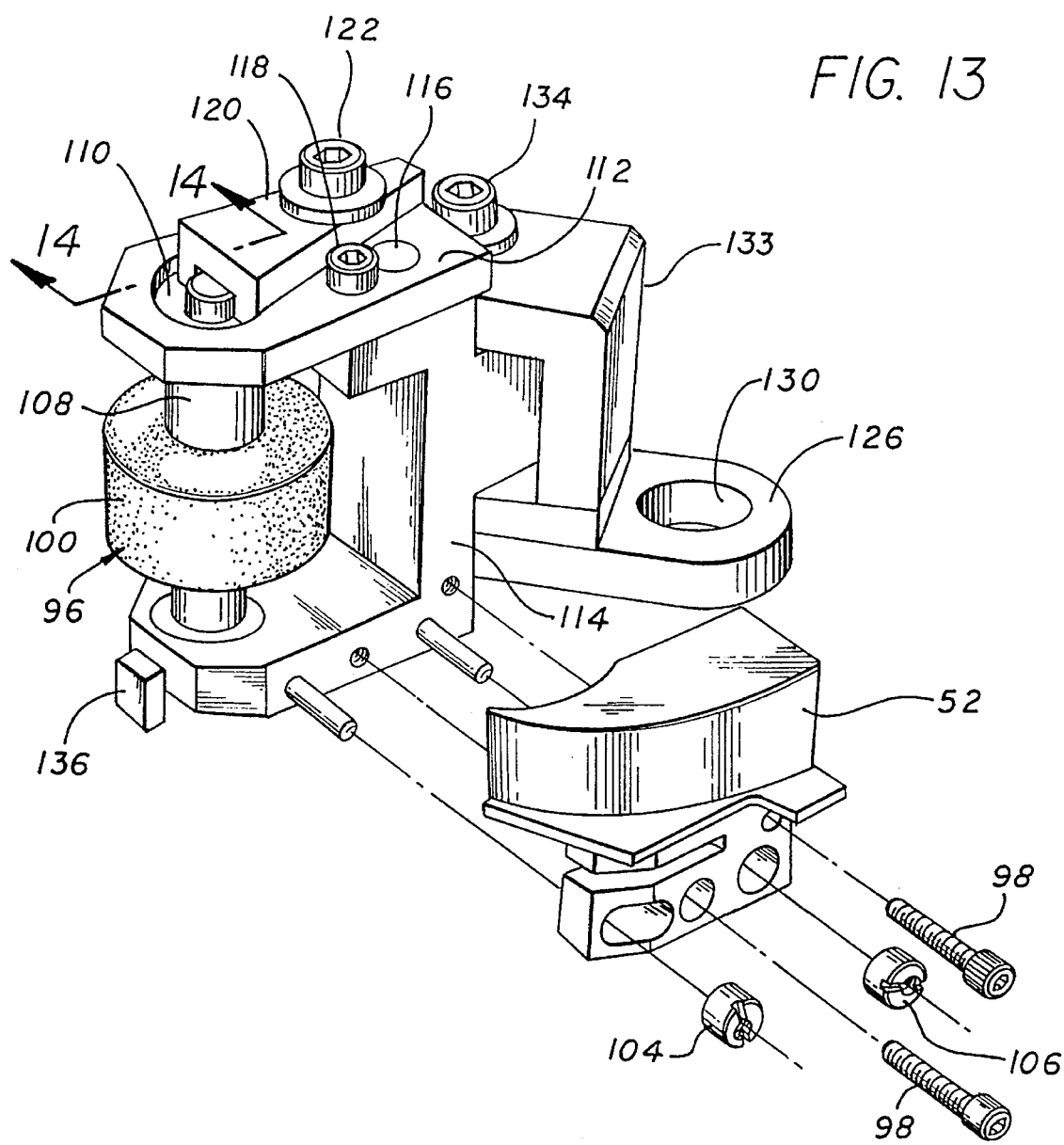
FIG. 13 is an enlarged, partly exploded, perspective view of the pinch roller and the guide means with the pinch roller and the guide means in the withdrawn position.
Figure 14:
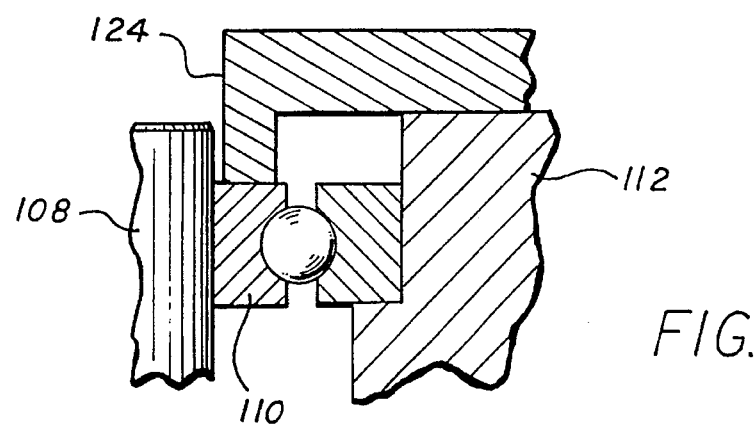
FIG. 14 is an enlarged fragmentary sectional view taken substantially on the line 14—14 of FIG. 13 and illustrates a bearing assembly associated with the pinch roller for assuring that the pinch roller does not rotate in an off-round relationship.

The shaft 108 is supported in a bearing 110 (FIG. 13 and 14) on a support plate 112 which is supported on a knuckle support 114 (FIG. 13). The support plate 112 is precisely positioned on the knuckle support 114 as by pins 116 and is then secured to the frame as by threaded bolts 118. A bearing plate 120 is secured to the top of the support plate 112 as by a threaded bolt 122. The bearing plate 120 is provided with lugs 124 (FIG. 14) which extend downwardly and engage the bearing 110 to create a force having axial and radial components on the bearing, the radial component of the force being directed inwardly toward the shaft 108. This force prevents the pinch roller 100 from being off-round as the pinch roller 100 rotates and presses against the capstan during such rotation. This force also prevents axial displacement of the pinch roller 100. The polyurethane pinch roller 100 is also preferably ground on centers to obtain a run-out of less than two ten-thousandths of an inch (0.0002").

The attention devoted to the pinch roller 100 and the supporting structure as discussed above assures that the pinch roller 100 will not wobble as it rotates. Wobbling of the pinch roller 100 is undesirable because it creates inaccuracies in the transfer of magnetic information from the master tape 10 to the thermomagnetic layer 14 on the slave tape 12. The pinch roller 100 is rotated by the capstan as a result of tension between the master tape 10 and the slave tape 12.

Figure 12:
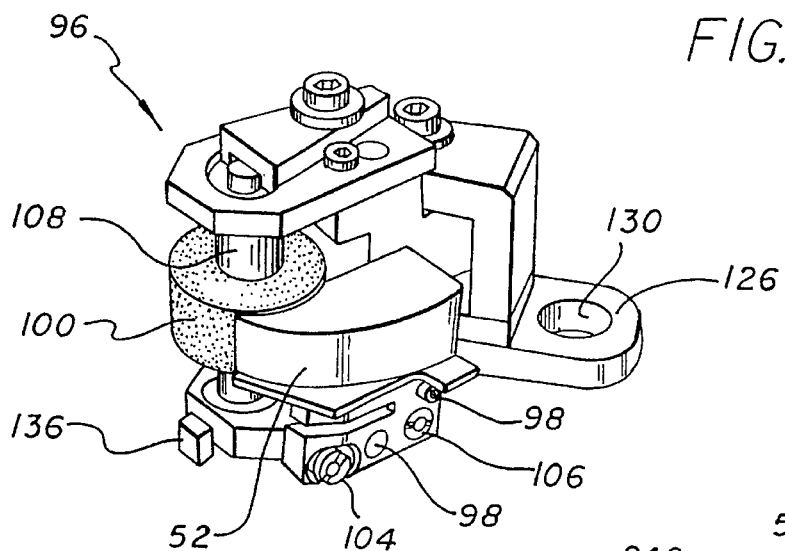
FIG. 12 is an enlarged perspective view of the pinch roller and the guide means, as seen from a position above and to one side of such means, for receiving the master tape, the pinch roller being disposed in a position withdrawn from an abutting relationship with a capstan.
Figure 12A:
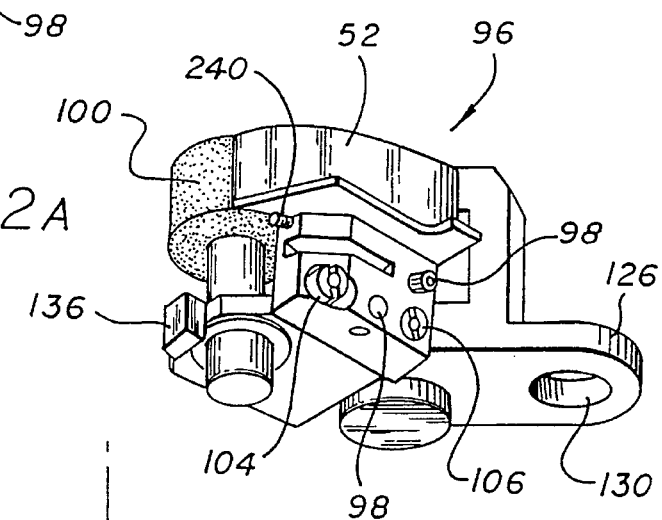
FIG. 12A is an enlarged perspective view of the pinch roller and guide means shown in FIG. 12 as seen from a position below and to the other side of such means with the pinch roller and the guide means in the withdrawn position.
Figure 12B:
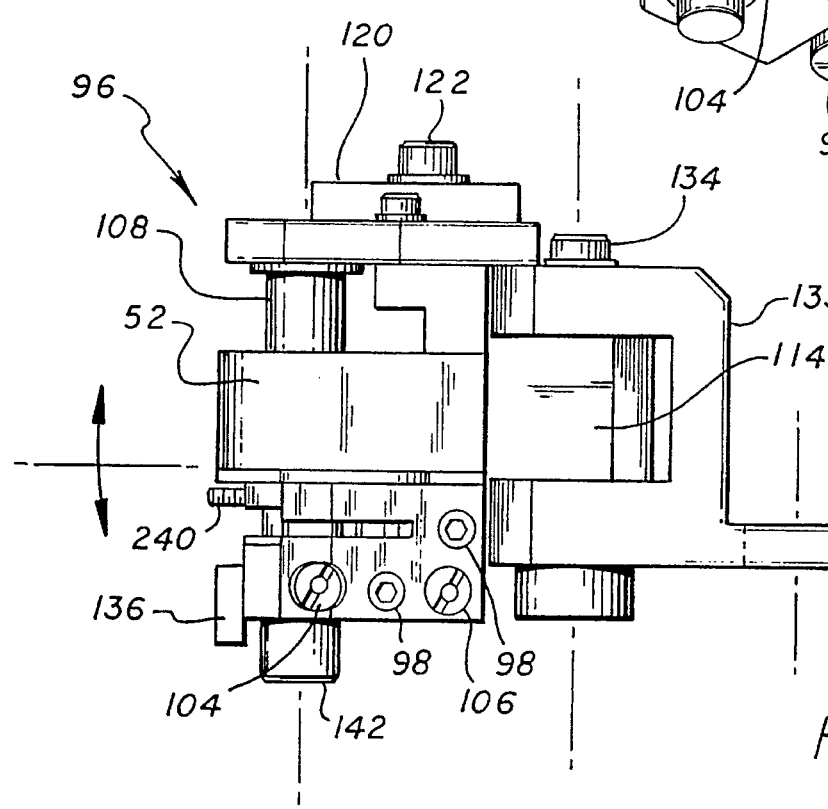
FIG. 12B is an enlarged elevational view of the pinch roller and the guide means with the pinch roller and the guide means in the extended position.
Figure 15:
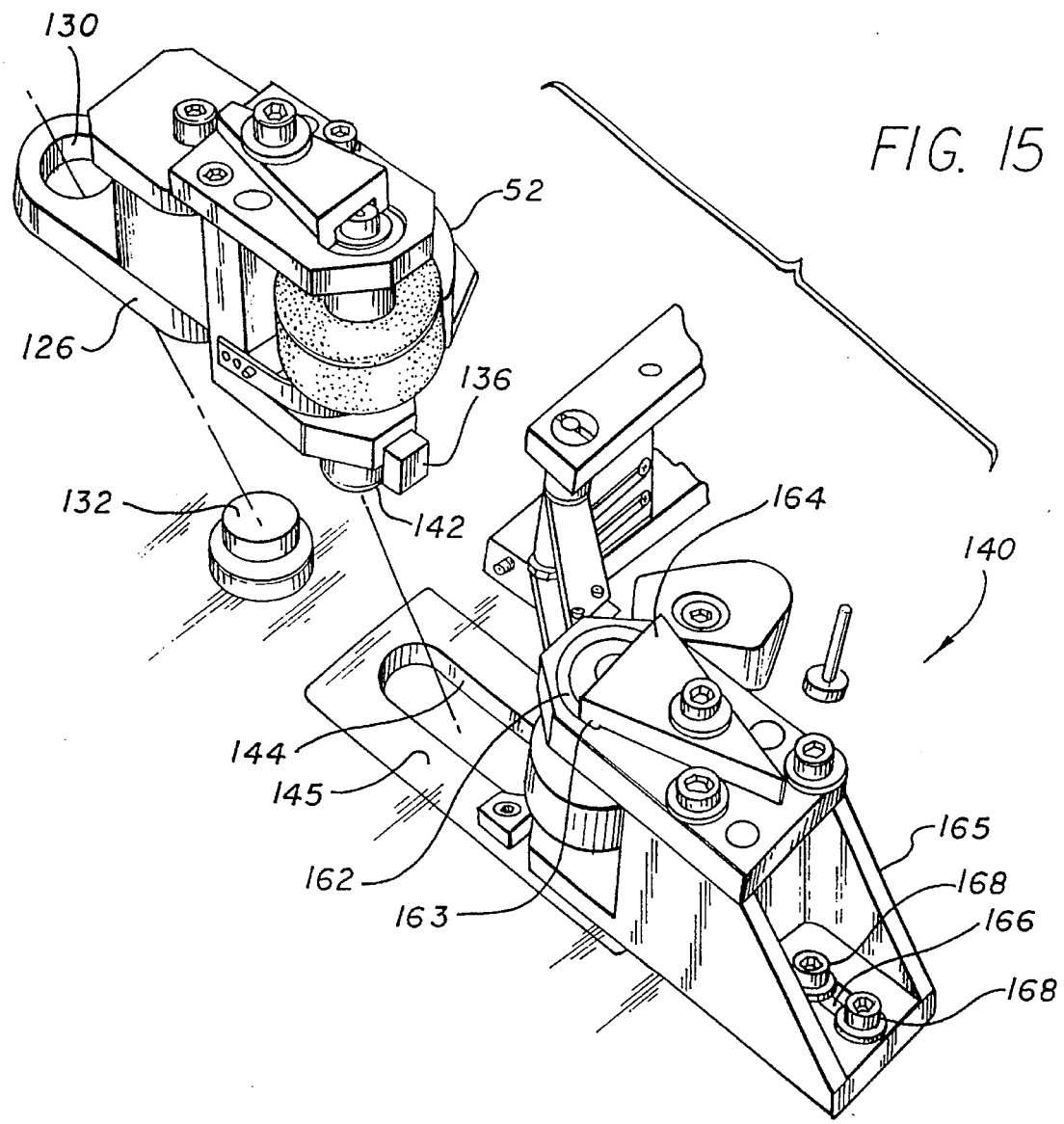
FIG. 15 is an enlarged exploded perspective view of the pinch roller and the guide means shown in FIGS. 12–14 and of the capstan assembly, as seen from a position above and to one side of these members, with the pinch roller and the guide means in the extended relationship shown in FIG. 18.

The pinch roller assembly 96 includes a base member 126 (FIGS. 12–13 and 15) extending from the bottom of the frame 114. The member 126 has a hole 130 for receiving a positioning knuckle 132 (FIG. 15) to provide for a rotation of the knuckle support 114 on the knuckle 132. The base member 126 forms a part of a frame 133. The knuckle support 114 is pivotably secured to the frame 133 as by a pivot pin 134 (FIGS. 12B and 13). An adjustable screw 135 (FIG. 23) is disposed on a post 137 to adjust the position of the knuckle 132 (FIG. 15).

Figure 16:
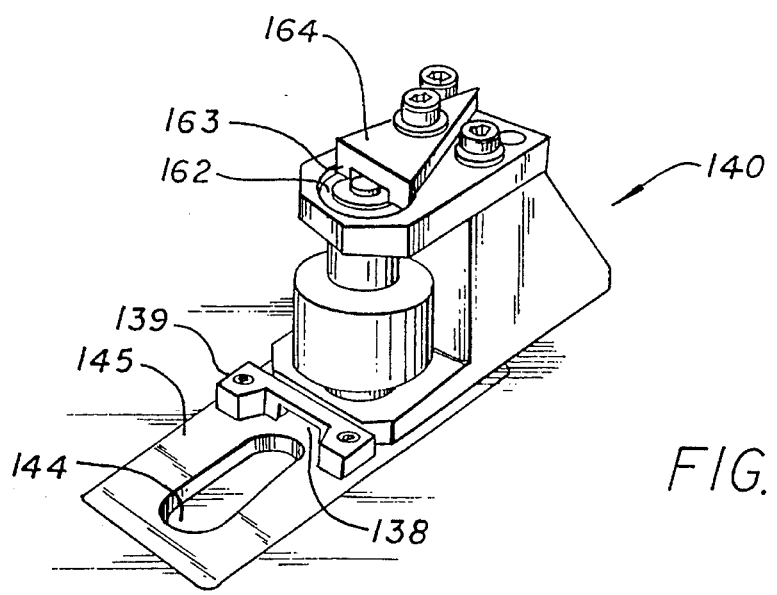
FIG. 16 is an enlarged perspective view of the capstan assembly, as seen from a position above and to the other side of the capstan assembly.

A lug 136 (FIG. 15) extends from the bottom of the knuckle support 114 and cooperates with a recess 138 (FIG. 16) in a positioning member 139 of a capstan assembly generally indicated at 140 to define a detent arrangement with the recess for locking the pinch roller assembly 96 to the positioning member 139. A bearing 142 (FIG. 15) on the end of the pinch roller shaft 108 is disposed in a slot 144 in a support plate 145 to facilitate the movement of the pinch roller assembly 96 into locking relationship with the capstan assembly 140. The pinch roller 100 and the guide 52 may be moved manually between the withdrawn position and the extended position or they may be moved by an actuator 157 (FIG. 1). The actuator 157, the vacuum source 59a, the source 60a of pressurized air, the drive motor 123 and the take-up motors 20 and 26 may be operated under the control of a controller 159 (FIG. 1).

A guide generally indicated at 151 (FIG. 1) and having a construction corresponding to that of the guide 52 is associated with the slave tape 12 in a manner similar to the association between the guide 52 and the master tape 10. The guide 151 may have a construction corresponding to that of the guide 51. However, peripheral surfaces 161 and 162 on the guide 151 preferably have less orifices 163 (FIG. 7) than the number of orifices 61 and 62 (FIGS. 4 and 6) in the peripheral surfaces 59 and 60 of the guide 52 respectively receiving the vacuum and the air under pressure. This provides for a lower braking action at the peripheral surface 161 of the guide 151 than the braking action provided at the peripheral surface 59 of the guide 52. However, depending upon the characteristics of the master tape 10 and the slave tape 12, the braking action at the peripheral surface 161 of the guide 151 may be equal to, or greater than the braking action at the peripheral surface 59 of the guide 52. The guide 151 is constructed to receive a vacuum from the source 59 in a manner similar to the guide 52. Although the guides 52 and 151 are shown as receiving a vacuum from the source 59a, it may be preferable to use separate sources for the guides 52 and 151 to enhance the tension controls provided by the guides.

Preferably the braking action provided at the peripheral surface 161 is less than the braking action provided at the peripheral surface 59 of the guide 52. This results from the fact that the slave tape 10 is lengthened as the slave tape 12 is heated to a temperature above the Curie temperature just before the slave tape 12 reaches the capstan. Since the slave tape 12 is lengthened by this heat, it does not have to be tensioned as much at the guide 151 as the tensioning of the master tape 10 by the guide 52 in order to obtain a transfer of the information on the master tape 10 to the slave tape 12 in what constitutes a mirror image after the slave tape has cooled to ambient temperatures.

The guide 151 is disposed so that the thermomagnetic layer 14 on the slave tape 12 faces outwardly from the external surface of the guide as the slave tape moves along this external surface. As with the relationship between the guide 52 and the pinch roller 100, the guide 151 is positioned close to a capstan 160 in the capstan assembly 140. Although the guide 151 is not adjustably positioned horizontally or vertically in a manner similar to that provided by the eccentrics 104 and 106 (FIGS. 12 and 13) for the guide 52, such adjustments may be provided without departing from the scope of the invention.

The capstan 160 and a shaft 161 (FIGS. 17, 18, 20, and 21) extending from the capstan are preferably formed from a single composite piece of material. Preferably the capstan is built with chrome plated brass brazed to a stainless steel shaft. The brass is desirable because it is non magnetic and does not corrode. Chrome is desirable because it is hard and can be polished to a fine finish. The capstan 160 and the shaft 161 are preferably constructed so that they have a minimal run-out. For example, the shaft 162 and the capstan 160 are preferably provided with an eccentricity of less than one ten thousandth of an inch (0.0001"). The shaft 161 and the capstan 160 are positioned relative to a support plate 167 in a manner similar to that provided for the shaft 108 by the pins 116 and the bolts 118.

The capstan 160 may be supported by a bearing arrangement (see FIG. 14) similar to that provided for the pinch roller 100. This arrangement includes bearings 162 and lugs 163 (FIG. 15–18) extending from a plate 164 to fixedly position the capstan 160 in the axial direction and inwardly in the radial direction. The capstan assembly 140 is provided with a frame 165 (FIGS. 15 and 21) having a slot 166 in its base for adjustable positioning on a table (not shown) on which the capstan assembly rests. When the capstan assembly 140 has been adjusted to the desired position, the capstan assembly is fixedly positioned on the table by tightening screws 168 extending through the slot 166 to the table. The capstan assembly 140 is adjustably disposed in the frame 165 relative to the fixedly positioned member 139 (FIGS. 16 and 20) which defines at one end the recess 138 for providing the detent relationship with the lug 136 in the pinch roller assembly 96.

A heater generally indicated at 172 (FIGS. 22–23 and 27–28) is disposed between the guide 151 and the capstan 160 to receive the slave tape 12 with the thermomagnetic layer 14 of the slave tape facing the heater. The heater is preferably disposed in contiguous relationship to the guide 151 and the capstan 160. The heater 172 is preferably constructed to heat only the thermomagnetic layer 14 of the slave tape 12 to a temperature above the Curie temperature. If the supporting tape were heated to a temperature above the Curie temperature, the thermomagnetic layer 14 would tend to shrink relative to the supporting tape. This would tend to cause the tape to become excessively cupped and would prevent the image on the master tape 10 from becoming transferred accurately to the slave tape 12. The heater 172 is provided with a relatively short length to prevent the slave tape 12 from becoming blistered by an excessively long time of contact with the heater. For example, this contact between the heater 172 and the slave tape should preferably not exceed five milliseconds (0.005 sec).

The heater 172 is disposed as close as possible to the capstan 160. The thermomagnetic layer 14 on the slave tape 12 becomes heated by the heater 172 to a temperature above the Curie temperature. During the time that the slave tape 12 moves from the heater 172 to the capstan 160, the thermomagnetic layer 14 cools somewhat. Therefore, the heater 172 heats the thermomagnetic layer 14 to a temperature sufficiently above the Curie temperature such that the thermomagnetic layer 14 does not cool below the Curie temperature until after the thermomagnetic layer 14 reaches the capstan and contacts the magnetizable layer 11 of the master tape. This causes the magnetic information on the master tape 10 to be transferred accurately to the thermomagnetic layer 14 on the slave tape 12 without having to use any magnetic heads to obtain such a transfer.

Furthermore, since the temperature of the magnetizable layer 11 of the master tape 10, after contacting the thermomagnetic layer 14 of the slave tape 12, can rise only to the average of the temperatures of the magnetizable layer 11 and the thermomagnetic layer 14 before the contact, the characteristics of the master tape 10 are not affected even if the magnetizable layer 11 is a thermomagnetic layer of the same type as that of thermomagnetic layer 14.

The heater 172 is disposed in a particular relationship to the guide 151 and the capstan 160. In this particular relationship, the thermomagnetic layer 14 on the slave tape 12 faces away from the external surfaces of the guide 151 and the capstan 160. In facing away from the external surface of the capstan 160, the thermomagnetic layer 14 directly abuts the magnetizable layer 11 on the master tape 10 (see FIG. 38). In this way, the transfer of the magnetic information on the master tape 10 to the thermomagnetic layer 14 on the slave tape 12 is facilitated. However, the thermomagnetic layer 14 directly faces the external surface of the heater 172. In this way, heat can be transferred directly to the thermomagnetic layer 14 without having to pass through the backing member supporting the thermomagnetic layer. This facilitates the heating of the thermomagnetic layer 14 to a temperature above the Curie temperature without heating the remainder of the slave tape 12 to such a high temperature.

The heater 172 is relatively short and thin. In this way, the thermomagnetic layer 14 can be heated to a temperature above the Curie temperature without significantly affecting the temperature of the backing member supporting the thermomagnetic layer. Furthermore, by making the heater 172 short and thin, the heater can be disposed close to the capstan 160. This facilitates the ability of the thermomagnetic layer 14 to operate at a temperature close to the Curie temperature when the information on the master tape 12 is being transferred to the thermomagnetic layer. By making the heater 172 short and thin, the heat from the heater can be transferred to the thermomagnetic layer 14 in a relatively short period of time such as approximately two millisecond (2 ms) when the slave tape is moving at a speed of approximately one hundred and fifty inches per second (150 i.p.s.). This is desirable in insuring that only the thermomagnetic layer 14 (and not the supporting tape 12) is heated to a temperature above the Curie temperature. By making the heater short and thin, the surface of the heater disposed near the capstan 160 can be made flat rather than concave as in the prior art. A flat surface has engineering advantages and is significantly simpler to manufacture than a concave surface as in the prior art.

The heater 172 includes a support member 174 (FIGS. 31 and 33). Preferably the support member 174 is made from an insulating member such as a ceramic. Aluminum nitride is a desirable ceramic for certain important reasons. One reason is that it has a low coefficient of thermal expansion. Another reason is that it has a high thermal conductivity. In this way, the support member 174 is able to transfer heat quickly and efficiently to the thermomagnetic layer 14 on the slave tape 10 without changing its physical dimensions appreciably with increases in temperature and without a large thermal gradient. Aluminum nitride is also advantageous because it is relatively stable. Another advantage of aluminum nitride is that its external surface abutting the thermomagnetic layer 14 of the slave tape 12 can be polished to a great smoothness so as to maximize the surface area of contact and thus the heat transfer efficiency. This external surface is indicated at 176 in FIGS. 31 and 32.

The external surface 176 of the support member 174 may define a segment of a cylinder. This cylinder may have a radius of approximately one half of an inch (0.5"). It is desirable that the external surface 176 define a segment of a cylinder in order to assure that pockets of air will not be formed between the external periphery and the slave tape 12 as the slave tape moves along the internal periphery. As will be appreciated, the slave tape 12 moves in the direction of the curvature in the external surface of the support member 174. The maximum thickness of the support member 174 may have a dimension of thirty five thousandths of an inch (0.035").

As indicated at 175 (FIG. 33) at the input side of the insulating member 174, the external surface 176 of the insulating support member 174 may be rounded at its input end in the direction of movement of the slave tape 12 to provide a smaller radius than the radius at intermediate positions on the member. This assures that the slave tape 12 will not form a gap with the external surface 176 as it initially engages the external surface 176 of the member 174 at the input end of the member. The formation of such a gap is undesirable since it creates air pockets which allow the heater to get excessively hot. The air pockets also prevent the thermomagnetic layer 14 on the slave tape from being heated uniformly as the slave tape moves on the external surface 176. In like manner, the external surface 176 of the member 174 is rounded as at 177 at the output end with a smaller radius than at intermediate positions on this surface. This also prevents air pockets from being produced between the tape 12 and the external surface 176 of the member 174 at the output end of this surface as the slave tape 12 leaves the member.

The support member 174 has an external surface 178 (FIG. 31) opposite the surface 176. The surface 178 is preferably flat. As a first step in forming the heater 172, the support member 174, when formed from aluminum nitride, may be heated to an elevated temperature such as approximately 950° C. in air for a suitable period of time such as approximately two (2) hours. This causes a coating of aluminum oxide to be produced on the external surfaces of the support member 174. This coating of aluminum oxide appears to be desirable in retaining the coatings of materials subsequently deposited on the surfaces of the support member 174.

After the formation of the aluminum oxide on the surface 178 of the support member 174, the surface is subsequently cleaned thoroughly. A layer 180 (FIGS. 31 and 32) of titanium is then deposited on this surface in a suitable thickness such as approximately one thousand Angstrom (1000 Å). Titanium has good heat conductivity and a low coefficient of thermal expansion. Then a layer 182 of platinum having a thickness such as approximately four thousand Angstrom (4000 Å) is deposited on the titanium. The titanium layer 180 is desirable between the surface 178 of the support member 174 and the platinum layer 182 because titanium has an affinity for aluminum nitride, aluminum oxide and platinum.

The platinum layer 182 is then annealed at a suitable temperature such as approximately 750° C. for a suitable period of time such as approximately fifteen (15) minutes to soften the platinum. The platinum layer 182 is then cooled at a suitable rate such as approximately three centigrade degrees (3° C.) per minute to room temperature. This annealing of the platinum layer 182 prevents the platinum from cracking when heat and stress are imposed upon the heater 172. It also avoids any problems in the platinum when one side of the heater 172 is at a different temperature than the other side of the heater.

A layer of gold having a suitable thickness such as 200 micro inches (0.0002 inch) is then deposited as by plating on the platinum. The gold in the laterally middle portion of the layer is then removed to define two (2) terminals 190 and 192 (FIG. 32). The layers 190 and 192 of plated gold define the terminals for receiving an electrical voltage. This voltage is introduced to the gold layer 190 and 192 by straps 193 (FIG. 23) made from a suitable material such as gold-plated copper. This voltage produces a flow of current through the platinum layer 182 for heating the platinum layer. The platinum layer has a greater thickness on the input side (in the direction of movement of the slave tape 10) of the heater than on the output side of the heater, as indicated on an exaggerated basis at 194 in FIG. 33. In this way, the platinum 194 layer develops more heat on the input side of the heater than on the output side of the heater. This is desirable in insuring that the temperature in the thermomagnetic layer 14 of the slave tape 12 is brought quickly above the Curie temperature.

Preferably, the input side of the platinum layer 182 may provide a greater amount of power than the output side of the platinum even with a uniform thickness of the platinum layer. This results from the cooling of the platinum layer by the slave tape 12 as the slave tape contacts the heater. This causes the resistance of the platinum layer at the input side to be lower than the resistance of the platinum layer at the output side because the temperature coefficient of resistivity of platinum is positive. Such differences in resistance value cause the power generated at the input side of the platinum layer to be greater than the power generated at the output side of the platinum layer.

The distance between the gold terminals 190 and 192 is preferably greater by a particular distance than the lateral width of the slave tape 12. In this way, the thermomagnetic layer 14 on the slave tape 12 is heated substantially uniformly across the lateral width of the slave tape. With an optimum distance between the inner ends of the terminals 190 and 192 and the lateral peripheries of the slave tape 12, the platinum is able, in the distance between the inner ends of the terminals and the lateral peripheries of the slave tape, to heat the lateral peripheries of the thermomagnetic layer 14 on the slave tape 12 by an optimal amount. This causes the lateral peripheries of the thermomagnetic layer 14 on the slave tape 12 to be maintained at substantially the same temperature as the remainder of the thermomagnetic layer. If the distance between the inner ends of the terminals 190 and 192 and the lateral peripheries of the slave tape 12 is too great, the lateral peripheries of the thermomagnetic layer 14 on the slave tape 12 may tend to become overheated relative to the remainder of the thermomagnetic layer. If this distance is too small, the lateral peripheries of the thermomagnetic layer 14 on the slave tape 12 may tend to become underheated relative to the remainder of the thermomagnetic layer.

When the thermomagnetic layer 14 of the slave tape 12 is moved along the external surface 176 of the support member 174, the external surface 176 tends to accumulate an electrostatic charge. This electrostatic charge is undesirable since it tends to interfere with the movement of the slave tape by causing a stretching of the tape. To eliminate this electrostatic charge, the external surface 176 of the support member 174 may be initially coated with a layer 195 (FIG. 34) of titanium having a suitable thickness such as approximately five hundred Angstrom (500 Å). A layer of an electrically conductive material such as gold 196 having a suitable thickness such as approximately eight thousand Angstrom (8000 Å) may then be deposited as by sputtering on the titanium layer. A layer of gold 198 having a suitable thickness such as approximately one mil (1 m) may thereafter be deposited as by plating on the gold layer 196. The layers 194, 196 and 198 are connected to electrical ground and are effective in dissipating electrostatic charges as such electrostatic charges are formed by movement of the slave tape 10 on the external surface 176 of the member 174.

Figure 22:
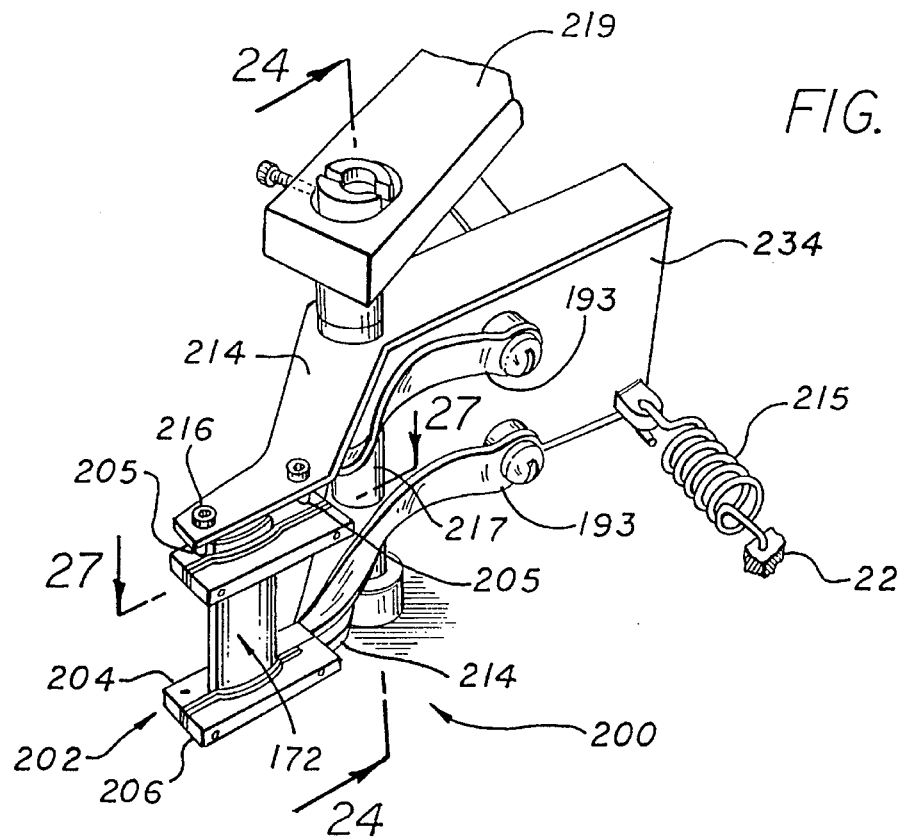
FIG. 22 is an enlarged perspective view of a heater assembly including a heater for heating the thermomagnetic layer on the slave tape to a temperature above the Curie temperature just before the slave tape reaches the capstan, the view being taken from a position above and to one side of the heater assembly.
Figure 23:
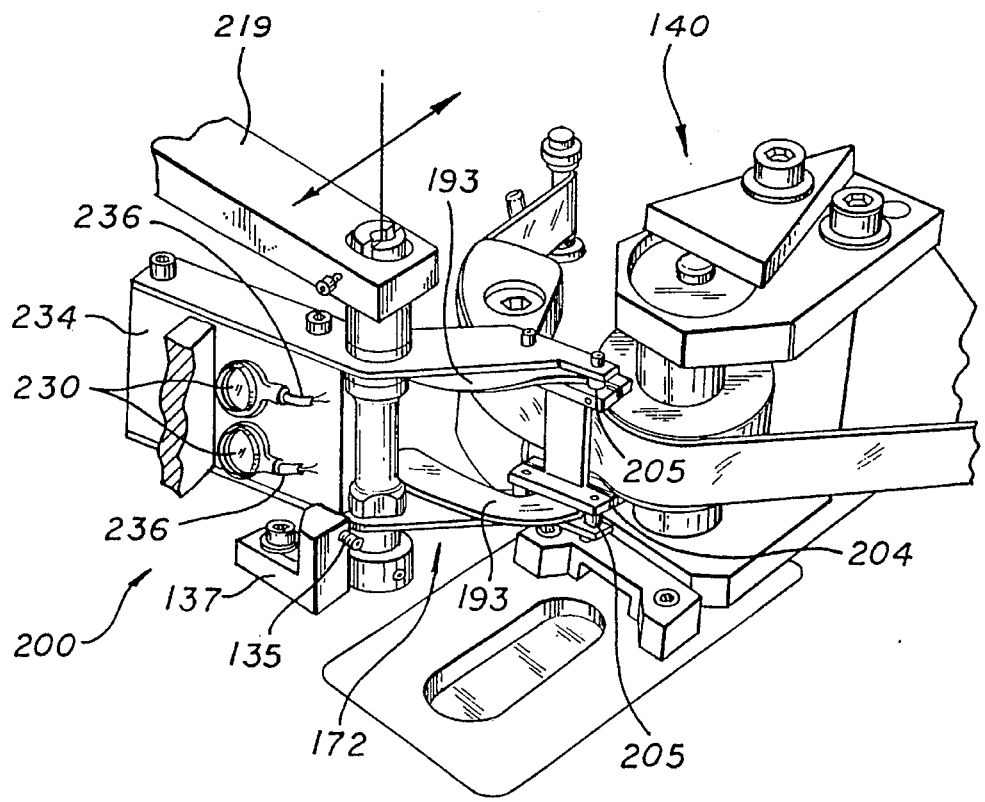
FIG. 23 is an enlarged perspective view of the heater assembly and the capstan assembly and the associated guide means as seen from a position above and to the other side of the heater assembly and further illustrates the disposition of the slave tape on the guide means, the heater and the capstan.
Figure 27:
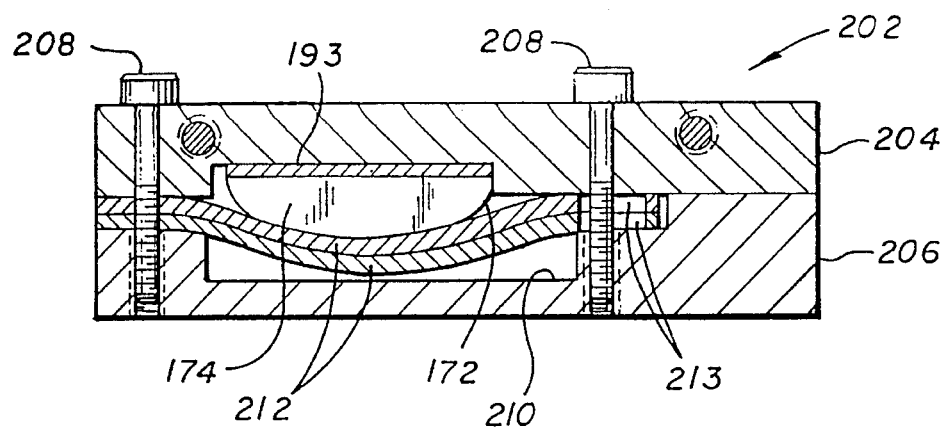
FIG. 27 is an enlarged sectional view taken substantially on the line 27—27 of FIG. 22 and illustrates the heater and the construction of members for holding the heater in a fixed position on the heater assembly.
Figure 28:
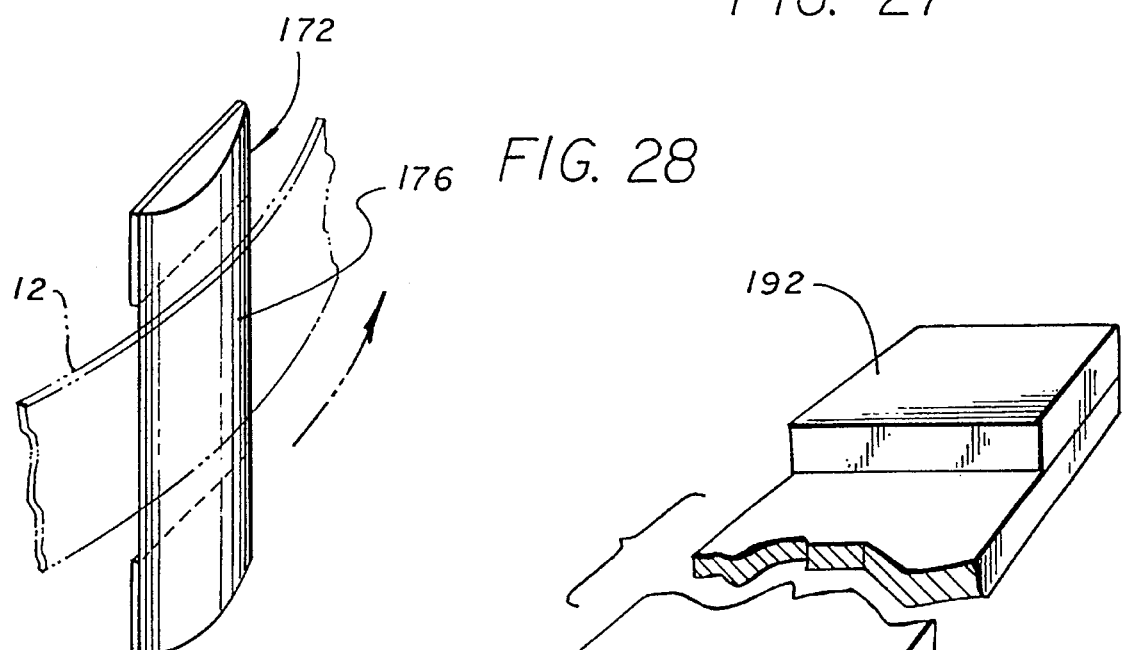
FIG. 28 is a schematic perspective view illustrating the disposition of the slave tape on the heater.
Figure 29:
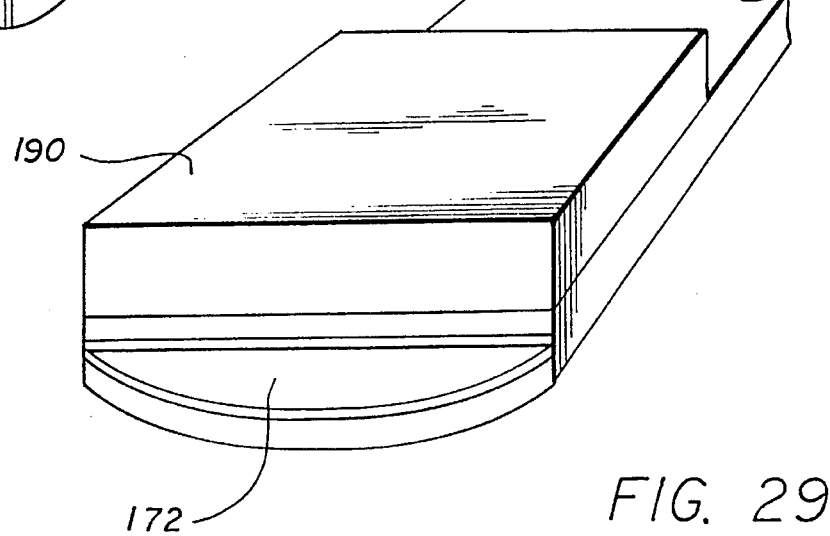
FIG. 29 is an enlarged fragmentary perspective view of the heater and illustrates additional details concerning the construction of the heater.

The heater 172 is included in a heater assembly generally indicated at 200 (FIGS. 22 and 23). The heater assembly 200 includes a pair of holder assemblies generally indicated at 202 (FIG. 22). The holder assemblies 202 are disposed at the top and bottom of the heater 172 to hold the heater in a fixed position. Each of the holder assemblies 202 includes a pair of positioning members 204 and 206 (FIG. 27) which are clamped to each other as by threaded bolts 208 (FIG. 27). The positioning members 204 and 206 define an internal socket 193 (FIG. 27) for receiving the heater 172. The socket 193 is slightly oversized relative to the heater 172 to provide for any expansion of the heater with heat. Spacers 205 (FIGS. 22 and 23) made from a material providing a low heat transfer are disposed adjacent the positioning members 204 and 206 to limit the transfer of heat from the positioning members.

A pair of springs 212 (FIG. 27) are disposed between the positioning members 204 and 206 at the opposite ends of the heater 172 and are disposed on the heater 172 to support the heater in a fixed position within the socket 193. The springs 212 may be made from a suitable material such as Inconel 718. Inconel 718 is desirable because it has good properties at high temperatures and because it does not take a permanent set when heated. The springs 212 are disposed in the internal socket 193 so as to be expansible with increases in temperature. The springs 212 may initially be flat and may be deformed as shown in FIG. 27 when they are disposed on the heater 172. The springs 212 may be provided with an extended slot 213 to provide for expansion relative to the heater 172 and the positioning members 204 and 206.

The heater assembly 202 also includes a pair of bridge members 214 (FIG. 22) which are attached to the heater assembly 200 as at 216 to position the heater 172 in facing relationship with the thermomagnetic layer 14 on the slave tape 12. A shaft 216 (FIG. 24) extends through the bridge members 214 and a support plate 219 to provide for a pivotal movement of the heater 172 to a position abutting the thermomagnetic layer 14 on the slave tape 12 or to a position displaced from the slave tape. When the heater 172 is displaced from the slave tape 12, the disposition of the slave tape on the guide 151 and the capstan 160 can be facilitated. The heater 172 becomes displaced from the slave tape 12 as by a spring 215 (FIG. 22) which is attached at one end to the heater assembly 200 and at the other end to a fixed post 223. A leaf spring 221 (FIGS. 17 and 18) acts to move the heater assembly toward the capstan 160 as the pinch roller extends.

As shown in FIGS. 24–25, an eccentric 218 is disposed within the support plate 219. As the eccentric 218 is turned, the shaft 216 is moved in a slot 220 (FIG. 26) so as to tilt the heater 172 horizontally. A positioning pin 222 (FIGS. 24 and 25) is threaded in a hole 224 in the support plate 219 to lock the eccentric 218 after the eccentric has been turned to the desired position. An insert 226 (FIG. 26) is disposed on the shaft 216 at a position below the eccentric 218. A Belleville spring 228 (FIG. 24) is disposed on the shaft 216 between the insert 226 and a spacer 230 (FIGS. 23 and 24) to hold the insert 226 against the eccentric 218 for maintaining the position of the heater assembly. Electrical insulators 229 and 231 electrically isolate the upper and lower bridge members 214. Electrical terminals 230 (FIGS. 23 and 24) are provided on an insulating block 234 disposed between the bridge members 214 at the end of the bridge members opposite the heater 172. The terminals 230 hold the ends of the straps 193 opposite the heater 172. Electrical leads 236 extend from the terminals 230 to a voltage source (not shown) for producing a current through the platinum layer 182 (FIGS. 31 and 32) or the platinum layer 194 (FIG. 33) to heat the heater.

The heater 172 is locked in position between two opposite pins when it is disposed to receive the slave tape 12 moving from the guide 151 to the capstan 160. One of the pins is disposed on the pinch roller assembly 96 at a position below the guide 151 and is indicated at 240 in FIGS. 12A and 36. The other pin is indicated at 242 in FIGS. 21, 35 and 36 and is adjustably threaded in a fixed support member 244 in FIGS. 35 and 36. The pin 242 is fixedly retained in the support member 244 as by a nut 246. The pins 240 and 242 respectively bear against the opposite surfaces of the lower holder assembly 202. When the heater 172 is positioned between the pins 240 and 242, it still has a slight adjustability such as in the order of a few mils. This provides for a fixed and precise positioning of the slave tape 12 on the heater 172 while still providing for a slight adjustment in this precise positioning.

Figure 17:
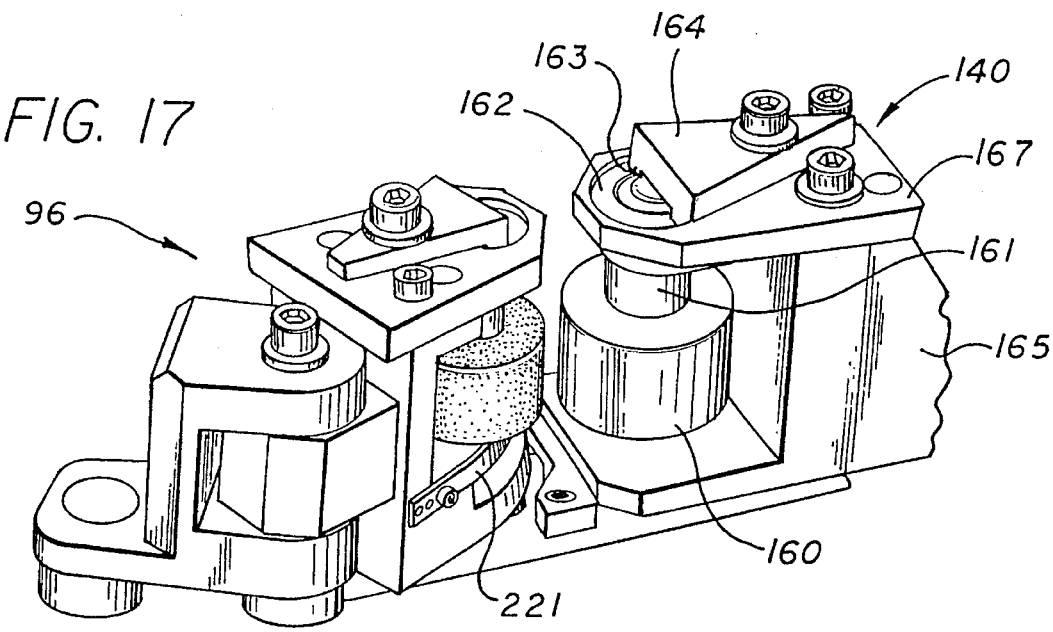
FIG. 17 is an enlarged perspective view of the pinch roller and the associated guide means and of the capstan assembly, as seen from a position above and in front of these members, when the pinch roller and the guide means have been extended almost to the position of the pinch roller abutting the capstan.

In order to position the master tape 10 properly on the pinch roller 100 and the slave tape properly on the capstan 160, the pinch roller assembly 96 is moved to a position where the pinch roller is displaced from the capstan 160. The guide 52 is also movable with the pinch roller 100 to the position displaced from the capstan 160. With the pinch roller 100 and the guide 52 in the displaced positions, the slave tape 12 can be disposed on the capstan 160. The positioning of the slave tape 12 on the capstan 160 is facilitated by the pivotal movement of the heater assembly 200 away from the capstan on the shaft 216 (FIG. 24) as a fulcrum. The movement of the heater assembly 200 away from the capstan is provided by the spring 215 in FIG. 22. After the slave tape 12 has been disposed on the capstan 160, the heater assembly 200 can be released. The heater 172 will then return to the position where it abuts the thermomagnetic layer 14 on the slave tape 12. This is provided by the spring 221 (FIG. 17).

When the slave tape 10 has been disposed on the guide 151, the heater 172 and the capstan 160, the bevelled surface and the ledge of the guide 151 corresponding to the bevelled surface 50 (FIG. 9) and the ledge 53 on the guide 52 position the slave tape so that the slave tape moves to a particular position on the capstan 160. If the slave tape 12 does not move to the particular position on the capstan 160, the position of the guide 151 can be adjusted vertically in accordance with adjustments in an eccentric on the guide 151 corresponding to the eccentric 104 (FIGS. 12 and 13). The position of the guide 151 can also be adjusted vertically, as by a tilting motion, by adjusting an eccentric in the guide 151 corresponding to the eccentric 106 (FIGS. 12, 12A, 12B and 13) in the guide 52. In the embodiment constructed, eccentrics corresponding to the eccentrics 104 and 106 on the guide 52 were not provided on the guide 151. However, it will be appreciated that such eccentrics can be provided on the guide 151 without departing from the scope of the invention.

The heater 172 can be tilted by adjusting the position of the eccentric 218 (FIGS. 24–25) in the heater assembly 200.

Since the heater 172 is disposed relatively close to the capstan 160, the adjustment provided by the eccentric 218 can be considered to provide a fine control over the positioning of the slave tape 12 on the capstan. In this way, the movement of the slave tape 12 to the capstan 160 can be controlled so that the slave tape has a precise position on the capstan. This is important in insuring that a precise transfer of information is provided from the master tape 10 to the thermomagnetic layer 14 on the slave tape 12 at the abutting positions of the pinch roller 100 and the capstan 160.

Figure 35:
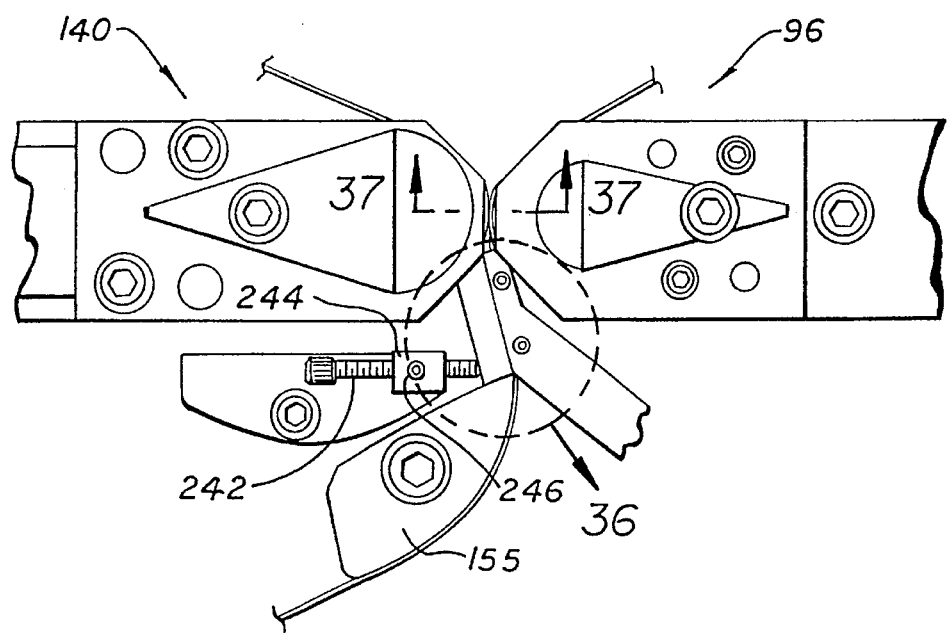
FIG. 35 is an enlarged fragmentary plan view of the pinch roller, the capstan, the guide means associated with the capstan, and the heater assembly in the operative positions of these members.
Figure 36:
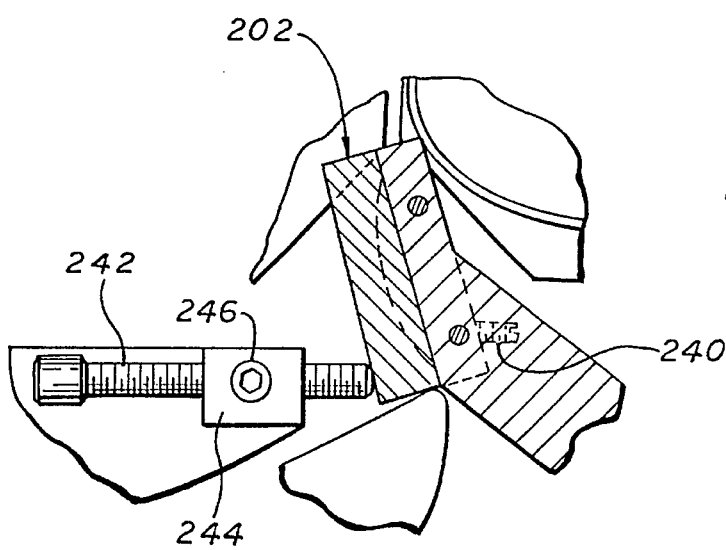
FIG. 36 is an enlarged fragmentary view, partly in section, of the portion of the members shown in FIG. 35 within a broken circle designated by the numeral "36" in FIG. 35.

The master tape 10 is disposed on the guide 52 and the pinch roller 100 while the guide and the pinch roller are displaced from the capstan 160. The guide 52 and the pinch roller 100 are then moved to a position where the pinch roller abuts the capstan. At the end of this movement, the pinch roller 100 becomes locked to the capstan 160 by the locking arrangement between the lug 136 (FIGS. 12, 12A and 12B) on the pinch roller assembly and the recess 138 (FIG. 16) in the capstan assembly 140. When the pinch roller 100 becomes locked to the capstan 160, the heater 172 also becomes locked into position (except for a slight play of a few thousands of an inch) by the pin 240 (FIGS. 12A and 36) on the pinch roller assembly 96 and by the adjustably positioned pin 242 (FIGS. 35 and 36).

The master tape 10 is precisely positioned on the pinch roller 100 by the inclined surface 50 (FIG. 9) and the ledge 53 on the external surface of the guide 52. The inclined surface 50 and the ledge 53 cause the master tape 10 to become positioned on the ledge 53 as the master tape 10 moves along the guide 52. The position of the master tape 10 on the pinch roller 96 can be further adjusted by adjusting the eccentrics 104 and 106 (FIGS. 12, 12A, 12B and 13). The eccentric 104 provides a vertical adjustment in the position of the guide 52 and the eccentric 106 provides a horizontal adjustment in the position of the guide albeit at a position displaced from the eccentric 104. Thus the eccentric 104 and the eccentric 106 in combination provide an adjustment of the height and the tilt of the guide 52. In this way, the master tape 10 can be directed to a position on the pinch roller 100 precisely corresponding to the position of the slave tape 12 on the capstan 160.

As will be appreciated, the master tape 10 is strained in one direction by the bevel or incline in the surface 50 (FIG. 9) in the guide 52. This strain in one direction is compensated in the other direction by the pin 48 (FIGS. 1 and 11). In like manner, the pin 154 compensates for the strain imposed on the slave tape 12 by the bevel in the surface of the guide 151 corresponding to the inclined surface 50 in the guide 52.

The guide 52 regulates the tension of the master tape 10 at a position contiguous to the pinch roller 100. In like manner, the guide 151 regulates the tension of the slave tape 12 at a position contiguous to the capstan 160. These regulations of tape tension provide for a transfer of the video information on the tape 10 to the thermomagnetic layer 14 on the slave tape 12 in a mirror image with greater fidelity, this mirror image being provided after the slave tape has cooled to ambient temperature. This precise transfer is facilitated by the constant characteristics provided for the master tape 10 and for the slave tape 12. As will be appreciated, however, the constant characteristics provided for the master tape 10 may be different from the constant characteristics provided for the slave tape 12. This results from the fact that the regulated tension on the master tape 10 may be greater than the regulated tension provided on the slave tape 12 because of the expansion of the slave tape 12 by the heat from the heater 172 just before the slave tape reaches the capstan 160.

As will be appreciated, the guide 151 performs the same function on the slave tape 12 as the guide 52 performs on the master tape 10. However, the guide 151 for the slave tape 12 can have less orifices 163 on its peripheral surface 161 than the number of apertures 61 (FIG. 4) at the peripheral surface 59 of the guide 52 for the master tape 10. This may be seen from a comparison of FIGS. 6 and 7. The increased braking action provided by the guide 52 relative to that provided by the guide 151 results from the fact that the slave tape 12 is expanded by the heater 172 as it moves over the heater. In effect, the increased braking action of the guide 52 stretches the master tape 10 to conform to the expansion provided on the slave tape 12 by the heater 172.

Since each of the guides 52 and 151 has orifices which are covered by the respective ones of the tapes 10 and 12, very little air flows through the peripheral surfaces 59 and 161 which provide the braking action on the respective tapes. Therefore, the vacuum source 59a can be small and can have a low capacity. For example, a diaphragm type of aquarium pump can be used as the vacuum source 59a. A "Supra 4" pump distributed by Willinger Brothers of Wrightway Oakland, N.J., has been found satisfactory for use as the vacuum source 59a but a number of other pumps can also be used. This pump is designed as a pressure pump. It can be easily modified to provide a vacuum source by reversing the inlet and outlet ports and adjusting the diaphragm position.

Figure 39:
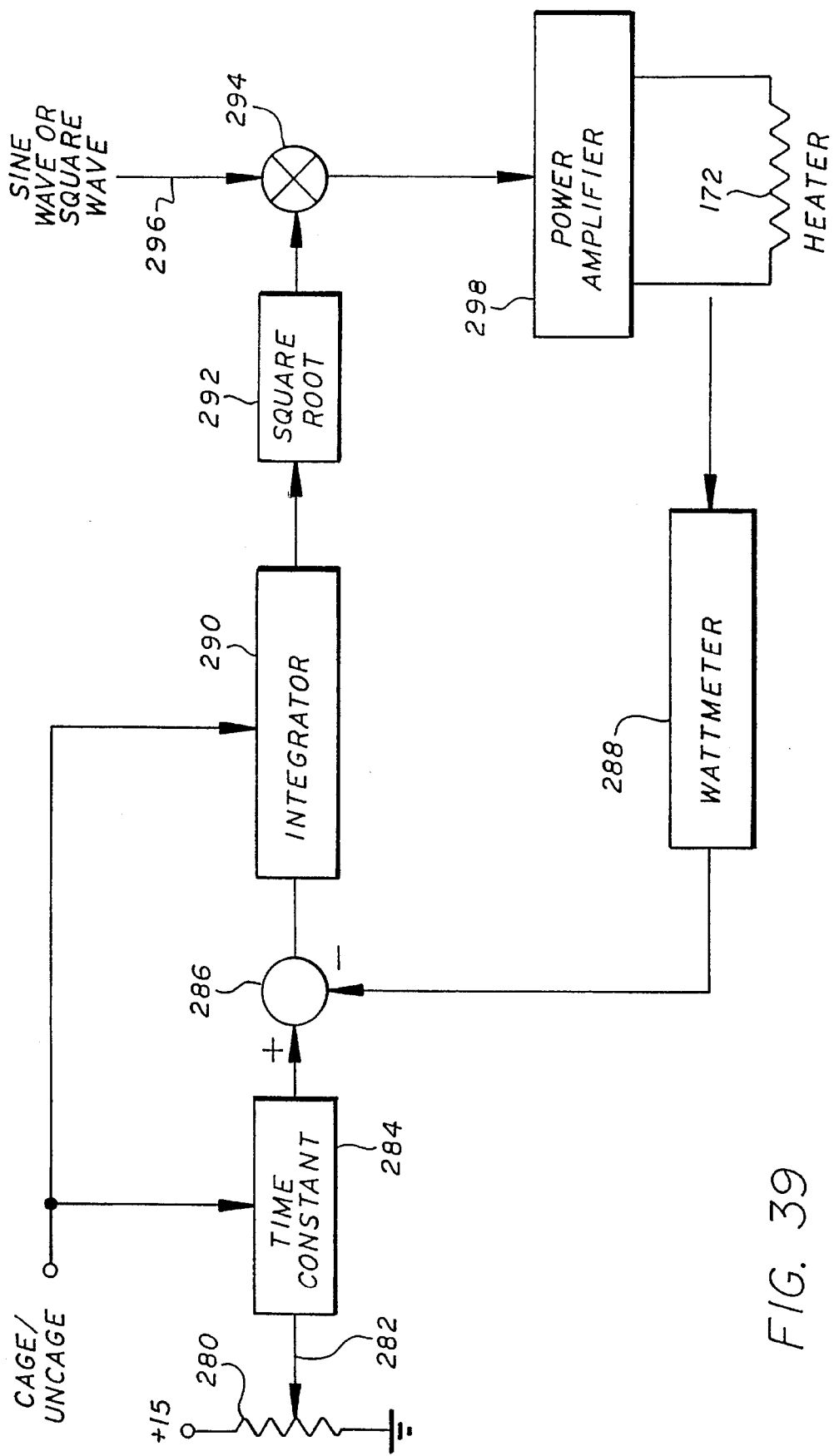
FIG. 39 is a schematic block diagram of a system for regulating the heat produced by the heater for the thermomagnetic layer on the slave tape and for providing a rapid heating of the heater on a regulated basis when the apparatus shown in the previous Figures initially becomes operative.

FIG. 39 is a schematic block diagram of a system for regulating the heat produced by the heater 172 and for providing an almost instantaneous heating of the heater on a regulated basis when the apparatus shown in FIGS. 1–38 initially becomes operative. The system shown in FIG. 39 includes a potentiometer 280 having an adjustable arm 282. The voltage on the adjustable arm 282 is introduced to a circuit 284 which multiplies the adjustable voltage by a transfer function such as a time constant to obtain a signal representing the desired amount of power to be introduced to the heater 172.

The signal from the time constant circuit 284 is introduced to a differencing circuit 286 which also receives a signal input from a wattmeter 288. The output from the differencing circuit 286 is introduced to an integrator 290. The output from the integrator 290 in turn passes to a stage 292 for obtaining a square root of the output from the integrator. The output from the square root stage 292 then passes to a multiplier 294 which also receives a signal on a line 296. The signal on the line 296 is an alternating signal having a particular waveform such as a sine wave or a square wave. A power amplifier 298 receives the output signal from the multiplier 294 and introduces an amplified signal to the heater 172. The input current and voltage to the heater are introduced to the wattmeter 288.

As will be seen, the system shown in FIG. 39 constitutes a closed loop servo for regulating the power introduced to the heater 172 in accordance with a desired amount of power represented by the voltage on the adjustable arm 282 of the potentiometer 280. This voltage is varied by the time constant provided by the stage 284. The resultant signal represents the desired power to be introduced to the heater 172.

The resultant signal from the stage 284 is introduced to the comparator 286 for comparison with the signal from the wattmeter 288. The signal from the wattmeter 288 represents at each instant the amount of power generated by the heater 172 at that instant. The output from the differencing circuit 286 accordingly represents at each instant any difference between the desired power and the actual power introduced to the heater 172 at that instant.

The difference signal from the differencing circuit 286 is introduced to the integrator 290 which integrates the difference signal at progressive instants of time. The output from the integrator 290 is introduced to the stage 292 which determines at each instant the square root of the output from the integrator 290. The output from the stage 292 accordingly represents the power introduced to the heater 172 at that instant.

The square root output from the stage 292 is in the form of a variable direct voltage. This signal is introduced to the multiplier 294 for multiplication with an alternating signal, such as a sine wave signal or a square wave signal, on the line 296. The resultant alternating signal is amplified by the amplifier 298 and the amplified signal is introduced to the heater 172.

In this way, the heat produced in the heater 172 at each instant is regulated in accordance with a desired amount of heat as represented by the voltage on the adjustable arm 282 of the potentiometer 280. The square root function 292 assures that the power into the heater is a linear function of the position of the potentiometer arm 282. Without the square root function 292, relatively small changes in the position of the potentiometer arm 282 at typical operating powers will cause large changes in the heater power. It will be appreciated that the potentiometer 280 can be replaced by other command means such as a digital-to-analog converter connected to a microprocessor. The system shown in FIG. 39 and discussed above provides this regulation on an instantaneous basis. For example, this regulation is provided in less than a second after the slave tape 12 starts to move.

The time constant stage 284 and the integrator 290 may be caged while the system shown in FIGS. 1–38 is not in use. When the time constant stage 284 and the integrator 290 are caged, a low amount of power is introduced to these stages to prepare the system shown in FIG. 39 for instantaneous operation when the transfer of information from the master tape 10 to the slave tape 12 is initiated. When the transfer of information from the master tape 10 to the slave tape 12 is initiated, the time constant stage 284 and the integrator 290 are uncaged.

The system described above has a number of important advantages. It provides a precise transfer of an image on a mirror basis from the master tape 10 to the slave tape 12 after the slave tape has cooled to ambient temperatures. It provides this precise transfer in a minimal period of time. For example, a two (2) hour tape of a movie can be transferred from the master tape 10 to the slave tape 12 in a period of approximately thirty (30) seconds. The system is also advantageous in that the master tape 10 can be disposed easily on the pinch roller 100 and the guide 52 associated with the pinch roller and the slave tape can be disposed easily on the capstan 160, the associated guide 151 and the heater 172. This is important when images are being transferred from the master tape 10 to the slave tape 12 on a commercial basis where time is important. The system is further advantageous in that the information on the master tape 10 can be transferred to the slave tape 12 without having to use any reading or recording heads.

The system of this invention also has other important advantages. For example, when the slave tape 12 has the thermomagnetic layer 14, the system of this invention heats essentially only the thermomagnetic layer to a temperature above the Curie temperature. This is important in conserving power and in preserving the characteristics of the slave tape 12 for subsequent use and in providing an accurate transfer of information from the master tape 10 to the slave tape 12. The system includes members for maintaining the tension on each of the master and slave tapes substantially constant. This enhances the accuracy in which the information on the master tape 10 is transferred to the slave tape 12. The system of this invention maintains the tensions on the tapes substantially constant and damps any variations in the tape tensions. The system accomplishes this by regulating the tension of the master tape 10 at a position contiguous to the pinch roller 100 and by regulating the tension of the slave tape 10 at a position contiguous to the heater 172.

There are other important advantages to the system of this invention. This results from the construction and operation of the guide member 52 in disposing the master tape 10 on the guide member to position the master tape precisely at a particular position on the pinch roller 100. It also results from the adjustability of the guide member 52, both vertically and with regard to its slope, to assure that the master tape 10 moves precisely to the particular position on the pinch roller 100.

The guide 151 may be constructed and may be adjustable in the same manner as the guide member 52 to position the slave tape 12 precisely at a particular position on the capstan 160 corresponding to the particular position on the pinch roller 100. If there is any deviation between the particular positions on the pinch roller 100 and the capstan 160, the position of the slave tape 12 on the capstan 160 can be fine tuned by adjusting the position of the heater 172 so that the position of the master tape 10 on the pinch roller 100 and the position of the slave tape 12 on the capstan 160 coincide.

The construction of the heater 172 and the disposition of the slave tape 12 on the heater are also advantageous. For example, the slave tape 12 is disposed relative to the heater 72 so that the thermomagnetic layer 14 on the slave tape 12 abuts the surface of the heater. Furthermore, the external surface of the heater 172 is shaped to prevent any air bubbles from lifting the slave tape 12 from the heater. The heater 172 is also formed from materials which assure an optimal operation of the heater. The heater 172 is also pivotable to a position displaced from the path of the slave tape to facilitate the disposition of the slave tape on the heater and the capstan 160 and disposition of the master tape 10 on the pinch roller 100.

The invention also provides other advantages of some importance. It includes features for precisely regulating the tension of the master tape 10 just before the movement of the master tape to the surface of the pinch roller 100. It also includes similar features for precisely regulating the tension of the slave tape 12 just before the movement of the slave tape to the surface of the heater 172, which is disposed in contiguous relationship to the capstan 160. The system of the invention provides these regulations of tape tension in a way to compensate for the stretching of the slave tape 12 by the heat from the heater 172.

There are even other important advantages in this invention. For example, the master tape 10 can be manufactured with certain specific constant characteristics (including the product of Youngs modulus, thickness and width) so that the mechanism regulating the tension of the master tape 10 never has to be adjusted even when master tapes manufactured at different times in different batches are used. Similarly, the slave tape 12 can be manufactured with certain specific constant characteristics (including the product of Youngs modulus, thickness and width) so that the mechanism regulating the tension of the slave tape 12 never has to be adjusted even when slave tapes manufactured at different times in different batches are used. As will be appreciated, the product of the Youngs modulus, thickness and width for the characteristics of the master tape 10 can have a different value than the product of the Youngs modulus, thickness and width for the characteristics of the slave tape 10 to compensate for the stretching produced in the slave tape by the heater 172.

The guide 52 has been described as being in contiguous relationship to the pinch roller 100. It will be appreciated, however, that the guide 52 may be disposed at any distance from the pinch roller 100 without departing from the scope of the invention and that the guide at these variable positions will still regulate the tension of the master tape 10 at the pinch roller 100 as described previously in this specification. Similarly, the guide 151 may be varied from a position contiguous to the heater 172 without departing from the scope of the invention.

It will also be appreciated that the guide 52 may be used with any stretchable medium to regulate the tension of such medium and that the master tape 10 is one form of such a medium. For example, the guide 52 may be used to regulate the tension of belts and pulleys. It will also be appreciated that such media may provide other transducing actions than the transfer of magnetic information between the master tape 10 and the slave tape 12. In like manner, the slave tape 12 constitutes only one form of stretchable medium which may be used in this invention, and the tension of such medium may be regulated as described above without departing from the scope of the invention.

As shown above in equations 11, 12 and 13, stretching of a tape is a function of the tape width, the tape thickness and the Youngs modulus of the tape. This can be used to regulate the force preset in the spring 66 in FIG. 5. As a first step in accomplishing this, the system shown in the drawings and described above runs the tape such as the master tape 10 at a tension T1 from the beginning of the tape to the end of the tape. The angle of rotation of the pinch roller 100 to provide such a tape movement is measured by a meter 300 in FIG. 43. If the radius of the capstan is R1 and the angle of rotation of the pinch roller 100 is β1 radians, the tape length L1 from the beginning to the end of the tape is $$L1 = R1\beta1 \tag{16}$$

The tape such as the master tape 10 is again run from beginning to end with the tape at a tension T2. The angle of rotation of the tape 10 as measured by the meter 300 is $$L2 = R1\beta2 \text{ where} \tag{17}$$

β2 is the angle of rotation of the pinch roller and L2 is the length of the tape.

The change in the strain on the tape between the two (2) tape rotations is $$\Delta e = (L2-L1)/L2 = (\beta2-\beta1)/\beta2 \tag{18}$$

By measurement, the change in tension is $$\Delta T = T2 - T1 \tag{19}$$

Therefore, $$\Delta e/\Delta T = (\beta2-\beta1)/(\beta2(T2-T1)) = EWd \tag{}$$

This relation of Δe/ΔT to obtain EWD may be seen from equation 13.

Since EWd (the product of tape width, tape thickness and Youngs modulus) can be determined in this manner, the tension T for such tape can be preset to obtain a desired strain e in accordance with the formula specified in equation 13 and repeated below as $$e = T/EWd \tag{13}$$

The tension T can be preset by adjusting the constraint of the spring 66 in FIG. 5. The constraint of the spring 66 is adjusted by adjusting the screw 67 in FIG. 5.

All of the operations discussed in the previous paragraphs can be accomplished by the apparatus shown in FIG. 43. For example, a microprocessor 302 can instruct an adjusting mechanism 304 to adjust the screw 67 in FIG. 5 to obtain the tension T1, and then to obtain the tension T2, in the tape 10. The microprocessor can then determine the change in the tension, ΔT, from the values set for the tension values T1 and T2. The microprocessor 302 can also use the measurements obtained from the meter 300 to determine the value of (β2−β1)/β2(T2−T1), this value being representative of the product of the width, thickness and Youngs modulus of the master tape. From this determination, the microprocessor 302 can then calculate the tension to be applied to the master tape 10 to produce a desired strain in the tape. The microprocessor 302 can then instruct the adjusting mechanism 304 to produce the proper constraint in the spring 66 in FIG. 5 for the production of the desired strain in the master tape 10.

It will be appreciated that the system shown in FIG. 43 and discussed above works as effectively in determining the characteristics of a slave tape 12 with unknown characteristics as in determining the characteristics of a master tape 10 with unknown characteristics. The system shown in FIG. 43 and discussed above also works as effectively in presetting the strain or tension of the slave tape 12 as in presetting the strain or tension of the master tape 10. The system also operates as effectively in presetting the strain or tension of any stretchable medium.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for operating upon a medium having stretchable characteristics to vary the tension in the medium, the medium having a width, a thickness and a Youngs modulus and having a particular product of the width, thickness and Youngs modulus of the medium, a guide surface, means for providing a source for the medium, means for providing a receptacle for the medium, means for driving the medium from the source to the receptacle, means for passing the medium over the guide surface during the movement of the medium from the source to the receptacle, means for producing a variable fluid pressure between the medium and the guide surface sufficient to separate the medium from the guide surface, and means disposed relative to the guide surface for regulating the tension of the medium in accordance with the variations in the fluid pressure and in accordance with the particular product of the width, thickness and Youngs modulus of the medium to regulate the separation between the medium and the guide surface.

2. In a combination as set forth in claim 1, guide means having a peripheral surface, the guide surface constituting the peripheral surface of the guide means, the guide means being constructed to produce the variable fluid pressure on the peripheral surface of the guide means, and the peripheral surface of the guide means being convex.

3. In a combination as set forth in claim 2, the guide means being constructed to provide a hollow interior and the peripheral surface having orifices communicating with the hollow interior to provide for the flow of the fluid through the hollow interior and the orifices and the medium being disposed to receive the fluid flowing through the orifices for a separation of the medium from the peripheral surface of the guide means by a distance dependent upon the pressure of the fluid passing through the orifices.

4. In combination for operating upon a medium having stretchable characteristics to vary the tension in the medium, a guide surface, means for providing a source for the medium, means for providing a receptacle for the medium, means for driving the medium from the source to the receptacle, means for passing the medium over the guide surface during the movement of the medium from the source to the receptacle, means for producing a variable fluid pressure between the medium and the guide surface sufficient to separate the medium from the guide surface, and means disposed relative to the guide surface for regulating the tension of the medium in accordance with the variations in the fluid pressure to regulate the separation between the medium and the guide surface, there being an image on the medium, the image on the medium being in magnetic form and the medium being a master tape and the image on the master tape being transferred to a slave tape, a pinch roller disposed after the guide surface in the direction of movement of the master tape, and a capstan disposed in abutting relationship to the pinch roller for receiving the slave tape to provide a transfer of the magnetic information on the master tape to the slave tape.

5. In combination for operating upon a medium having stretchable characteristics to vary the tension of the medium, the medium having a particular product of medium width, medium thickness and Youngs modulus, first means for holding the medium, second means for holding the medium, third means for driving the medium from the first means to the second means, guide means having a peripheral surface defining a segment of a cylinder, fourth means for maintaining the medium at a variable distance from the periphery of the guide means, and fifth means for regulating the tension of the medium in accordance with the particular product of the width, the thickness and the Youngs modulus of the medium and in accordance with the fourth means and the variation in the distance of the medium from the periphery of the guide means.

6. In a combination as set forth in claim 5, the peripheral surface of the guide means having a radius and an axis, the fifth means being constructed to maintain a particular radial spacing between the medium and the axis of the peripheral surface of the guide means in accordance with the fourth means and the particular product of the thickness, width and Youngs modulus of the medium, thereby regulating the tension of the medium.

7. In a combination as set forth in claim 6, the medium being a master tape for transferring an image on the master tape to a slave tape, a pinch roller disposed between the first means and the second means, a capstan disposed in abutting relationship to the pinch roller, the slave tape being positionable on the capstan for a pressing contact with the master tape to obtain a transfer of the image on the master tape to the slave tape, and means for driving the slave tape for movement on the capstan past the pinch roller.

8. In a combination as set forth in claim 7, the guide means being disposed relative to the pinch roller and being shaped to guide the master tape to the receiving surface of the pinch roller, and means on the guide means for guiding the movement of the master tape to a particular position on the pinch roller to assure the transfer of the information on the master tape to precise positions on the slave tape.

9. A method of regulating the tension on a stretchable medium, including the steps of:

providing a medium extending continuously in a longitudinal direction and having first and second spaced and parallel surfaces and having a width and a thickness and a Youngs modulus and having a particular product of the width, thickness and Youngs modulus to provide the medium with a particular strain when the medium is subjected to a first force on the medium in a direction substantially parallel to the first surface of the medium, the medium having properties of becoming stretched in accordance with the stress imposed upon the medium, providing a second variable force on the first surface of the medium in directions substantially perpendicular to the first surface of the medium, providing a third retarding force on the medium substantially in the direction opposite to the direction of the first force, varying the third retarding force on the medium in accordance with the second force on the first surface of the medium and the particular product of the width, thickness and Youngs modulus of the medium to obtain a regulation of the tension of the medium, providing a movement of the medium in a particular direction past the position at which the third retarding force is regulated.

10. A method as set forth in claim 9, including the step of:

the medium constituting a master tape including a backing member and a magnetizable material on a surface of the backing member in a substantially uniform thickness across the width of the backing member, and providing a transducing action of magnetic information between the magnetizable material on the backing member of the master tape and a magnetizable layer on a slave tape disposed in abutting relationship to the master tape after the regulation of the tension of the master tape.

11. A method as set forth in claim 9 wherein the particular product of the width, thickness and Youngs modulus of the medium provides for a particular strain with variations in the second force imposed on the first surface of the medium in the direction perpendicular to the first surface and wherein the tension of the medium is regulated at a particular value in accordance with the variations in the second force imposed on the first surface of the medium in the direction perpendicular to the first surface of the medium.

12. A method as set forth in claim 9 wherein the medium constitutes a backing member and a layer of a thermomagnetic material and the backing member and the layer of the thermomagnetic material define a slave tape and wherein the thermomagnetic layer on the slave tape has a Curie temperature above which magnetic information on the thermomagnetic magnetizable layer is destroyed and below which thermomagnetic information is recorded on the magnetizable layer and wherein heat is applied to the thermomagnetic layer of the slave tape at a position contiguous to the position at which the slave tape is moved on the peripheral surface of the rotary member and wherein the variable force is applied to the first surface of the backing member at a position before the position at which heat is applied to the thermomagnetic layer of the slave tape in the direction of movement of the slave tape.

13. A method as set forth in claim 9 wherein guide means is provided at a position at or before the position, in the direction of the medium, where the transducing action is provided and wherein the guide means is provided with a non-planar configuration to produce a non-planar configuration in the medium and wherein the guide means is constructed to provide a variable pressurized force at its peripheral surface in a direction perpendicular to the medium and wherein the pressurized force is regulated to control the separation of the medium member from the peripheral surface of the guide means.

14. In combination for operating upon a medium having stretchable characteristics to vary the tension of the medium, the medium having a particular product of medium width, medium thickness and Youngs modulus, first means for holding the medium, second means disposed in spaced relationship to the first means for holding the medium, third means for driving the medium from the first means to the second means, guide means having a peripheral surface, the guide means being disposed between the first means and the second means for receiving the medium on the peripheral surface of the guide means during the movement of the medium from the first means to the second means, fourth means for producing a vacuum on a first portion of the peripheral surface of the guide means, fifth means for producing a pneumatic force on a second portion of the peripheral surface of the guide means, and sixth means for varying the vacuum from the fourth means in accordance with the product of the width, thickness and Youngs modulus of the medium and in accordance with variations in the separation between the medium and the peripheral surface of the guide means at the second positions on the peripheral surface of the guide means to maintain such separation at a particular value.

15. In a combination as set forth in claim 14 wherein the first portion of the peripheral surface of the guide means is ahead of the second portion of the peripheral surface of the guide means in the direction of the movement of the medium between the first and second means.

16. In a combination as set forth in claim 14 wherein the peripheral surface of the guide means defines a segment of a cylinder.

17. In a combination as set forth in claim 14, the medium being a master tape for transferring an image on the master tape to a slave tape, a pinch roller disposed between the first means and the second means, a capstan disposed in abutting relationship to the pinch roller, the slave tape being positionable on the capstan for a pressing contact with the master tape to obtain a transfer of the image on the master tape to the slave tape, and means for driving the slave tape for movement on the capstan past the pinch roller.

18. In a combination as set forth in claim 14, the medium being a slave tape for duplicating an image on the slave tape from a master tape, a capstan disposed between the first means and the second means, the capstan having a periphery for receiving the medium, a pinch roller disposed in abutting relationship to the capstan, the master tape being positionable on the pinch roller for a pressing contact with the slave tape to obtain a transfer of the image on the master tape to the slave tape, and means for driving the master tape for movement on the pinch roller past the capstan.

19. In a combination as set forth in claim 18, the first portion of the peripheral surface of the guide means is ahead of the second portion of the peripheral surface of the guide means in the direction of the movement of the medium between the first and second means, the peripheral surface of the guide means defines a segment of a cylinder, the medium being a master tape for transferring an image on the master tape to a slave tape, a pinch roller disposed between the first means and the second means, a capstan disposed in abutting relationship to the pinch roller, the slave tape being positionable on the capstan for a pressing contact with the master tape to obtain a transfer of the image on the master tape to the slave tape, and means for driving the slave tape for movement on the capstan past the pinch roller.

20. In a method of operating upon a medium having stretchable characteristics to vary the tension of the medium, the medium having a particular product of medium width, medium thickness and Youngs modulus, the steps of:

providing a guide with a peripheral surface, moving the medium along the peripheral surface, applying a vacuum force to a first portion of the peripheral surface on the guide, applying a pneumatic force to a second portion of the peripheral surface on the guide, and varying the vacuum force at the first portion of the peripheral surface on the guide in response to variations in the separation between the medium and the peripheral surface at the second portion of the peripheral surface and in accordance with the particular product of the width, thickness and Youngs modulus of the medium to regulate at a particular value the separation between the medium and the peripheral surface at the second portion of the peripheral surface.

21. In a method as set forth in claim 20 wherein the first portion of the peripheral surface is upstream from the second portion of the peripheral surface in the direction of the movement of the medium.

22. In a method as set forth in claim 20 wherein the guide is hollow at its interior and is provided with orifices in its peripheral surface at the first and second portions of the peripheral surface and wherein the vacuum force is directed through the orifices in the guide at the first portion of the peripheral surface and wherein the pneumatic force is directed through the orifices in the guide at the second portion of the peripheral surface.

23. In a method as set forth in claim 20 wherein the peripheral surface of the guide defines a segment of a cylinder and wherein the vacuum and pneumatic forces are produced on the peripheral surface in a direction substantially perpendicular to the peripheral surface.

24. In a method as set forth in claim 23, the first portion of the particular surface is upstream from the second portion of the peripheral surface in the direction of the movement of the medium, and the guide is hollow at its interior and is provided with orifices in its peripheral surface at the first and second portions of the peripheral surface and wherein the vacuum force is directed through the orifices in the guide at the first portion of the peripheral surface and wherein the pneumatic force is directed through the orifices in the guide at the second portion of the peripheral surface.

* * * * *